(12) United States Patent
Ma et al.

(10) Patent No.: US 9,106,288 B2
(45) Date of Patent: Aug. 11, 2015

(54) PILOT SCHEME FOR A MIMO COMMUNICATION SYSTEM

(71) Applicant: Apple Inc., Cupertino, CA (US)

(72) Inventors: Jianglei Ma, Kanata (CA); Ming Jia, Ottawa (CA); Hua Xu, Nepean (CA); Wen Tong, Ottawa (CA); Peiying Zhu, Kanata (CA); Moussa Abdi, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/493,591

(22) Filed: Sep. 23, 2014

(65) Prior Publication Data

US 2015/0010097 A1  Jan. 8, 2015

Related U.S. Application Data

(63) Continuation of application No. 13/721,784, filed on Dec. 20, 2012, which is a continuation of application (Continued)

(51) Int. Cl.
*H04K 1/10* (2006.01)
*H04B 7/04* (2006.01)
(Continued)

(52) U.S. Cl.
CPC ............ *H04B 7/0452* (2013.01); *H04B 7/0413* (2013.01); *H04J 13/18* (2013.01);
(Continued)

(58) Field of Classification Search
CPC . H04W 72/04; H04W 72/0453; H04W 88/08; H04W 72/005; H04W 72/0413; H04W 72/044; H04W 72/048; H04W 16/10; H04W 72/12; H04W 88/06; H04W 88/04; H04L 5/0048; H04L 5/0023; H04L 25/0226; H04L 5/00; H04L 2025/03414; H04L 2025/03426; H04L 25/0204; H04L 27/261; H04L 5/003; H04L 5/005; H04L 5/0051; H04L 5/06; H04L 5/0032; H04L 27/2626; H04L 47/14; H04L 47/15; H04L 47/824
USPC ......... 370/329, 328, 330, 336, 436, 431, 335, 370/337, 294, 326, 442; 375/260, 267, 299, 375/264, 347; 455/103, 517, 102, 105, 91
See application file for complete search history.

(56) References Cited

U.S. PATENT DOCUMENTS 7,095,709 B2  8/2006  Walton et al.
7,239,659 B2  7/2007  Thomas et al.
(Continued)

FOREIGN PATENT DOCUMENTS

EP  1128592  8/2001
EP  1580950  3/2005
(Continued)

OTHER PUBLICATIONS

U.S. Appl. No. 13/721,784, filed Dec. 20, 2012, Jianglei Ma.
(Continued)

*Primary Examiner* — Rahel Guarino
(74) *Attorney, Agent, or Firm* — Meyertons, Hood, Kivlin, Kowert & Goetzel, P.C.

(57) ABSTRACT

The present invention employs a pilot scheme for frequency division multiple access (FDM) communication systems, such as single carrier FDM communication systems. A given transmit time interval (TTI) may include numerous traffic symbols and one or more pilot symbols. A mobile terminal may generate, for a transmitter, sounding pilot information and map the sounding pilot information onto at least certain sub-carriers within a TTI. The one or more pilot symbols may include at least a first group of subcarriers and at least a second group of subcarriers. The first group of subcarriers may be sounding pilots and the second group of subcarriers may be pilots for demodulation. The second group may not include sounding pilots.

20 Claims, 27 Drawing Sheets

Related U.S. Application Data

No. 12/088,589, filed as application No. PCT/IB2006/002714 on Sep. 29, 2006, now Pat. No. 8,363,739.

(60) Provisional application No. 60/722,807, filed on Sep. 30, 2005, provisional application No. 60/824,158, filed on Aug. 31, 2006.

(51) Int. Cl.

| | | |
|---|---|---|
| *H04L 5/00* | (2006.01) | |
| *H04L 27/26* | (2006.01) | |
| *H04W 72/04* | (2009.01) | |
| *H04W 88/08* | (2009.01) | |
| *H04J 13/18* | (2011.01) | |
| *H04L 1/06* | (2006.01) | |
| *H04L 25/02* | (2006.01) | |
| *H04J 13/16* | (2011.01) | |

(52) U.S. Cl.
CPC ............... *H04L 5/001* (2013.01); *H04L 5/005* (2013.01); *H04L 5/0026* (2013.01); *H04L 5/0048* (2013.01); *H04L 5/0051* (2013.01); *H04L 27/2613* (2013.01); *H04W 72/04* (2013.01); *H04W 72/044* (2013.01); *H04W 88/08* (2013.01); *H04J 2013/165* (2013.01); *H04L 1/0625* (2013.01); *H04L 5/0032* (2013.01); *H04L 25/0226* (2013.01); *H04L 25/0228* (2013.01)

(56) References Cited

U.S. PATENT DOCUMENTS

| | | |
|---|---|---|
| 8,000,221 B2 | 8/2011 | Walton et al. |
| 8,363,739 B2 | 1/2013 | Ma et al. |
| 2003/0072395 A1 | 4/2003 | Jia et al. |
| 2004/0082356 A1 | 4/2004 | Walton et al. |
| 2004/0114618 A1 | 6/2004 | Tong et al. |
| 2004/0240572 A1 | 12/2004 | Brutel et al. |
| 2005/0195908 A1 | 9/2005 | Dunn et al. |
| 2006/0209670 A1 | 9/2006 | Gorokhov et al. |
| 2007/0014272 A1* | 1/2007 | Palanki et al. ............... 370/344 |
| 2007/0041404 A1 | 2/2007 | Palanki et al. |

FOREIGN PATENT DOCUMENTS

| | | |
|---|---|---|
| EP | 1570588 | 9/2005 |
| WO | 03/034644 | 4/2003 |
| WO | 2004/038988 | 5/2004 |
| WO | 2004/039011 | 5/2004 |
| WO | 2004/056029 | 7/2004 |
| WO | 2005/081481 | 9/2005 |
| WO | 2005/107103 | 11/2005 |
| WO | 2006/034577 | 4/2006 |

OTHER PUBLICATIONS

Nortel Networks Limited; "UL SC-FDMA Based Virtual MIMO System Level Performance Evaluation forE-UTRA;" 3GPP TSG-RAN1 WG1 on LET, Jan. 23-25, 2006, Helsinki, Finland; pp. 1-4.

Nortel Networks Limited; "UL Virtual MIMO Transmission for E-UTRA;" 3GPP TSG-RAN1 Meeting #42bis, Oct. 10-14, 2005, San Diego, CA, USA; pp. 1-19.

Tong et aL; "Pilot-Assisted Wireless Transmissions;" IEEE Signal Processing Magazine, Nov. 2004, vol. 21 No. 6, IEEE; pp. 12-25.

Vook et aL; "Uplink Channel Sounding for TOO OFDMA;" IEEE 802.16 Broadband Wireless Access Working Group, Aug. 31, 2004; pp. 1-12.

Extended European Search Report in Application No. 06820768.7, dated Oct. 30, 2013, pp. 1-9.

Extended European Search Report from European Application No. 14188940.2, issued Jan. 26, 2015, Apple Inc., pp. 1-10.

Extended European Search Report from European Application No. 14193377.0, issued Mar. 6, 2015, pp. 1-7.

* cited by examiner

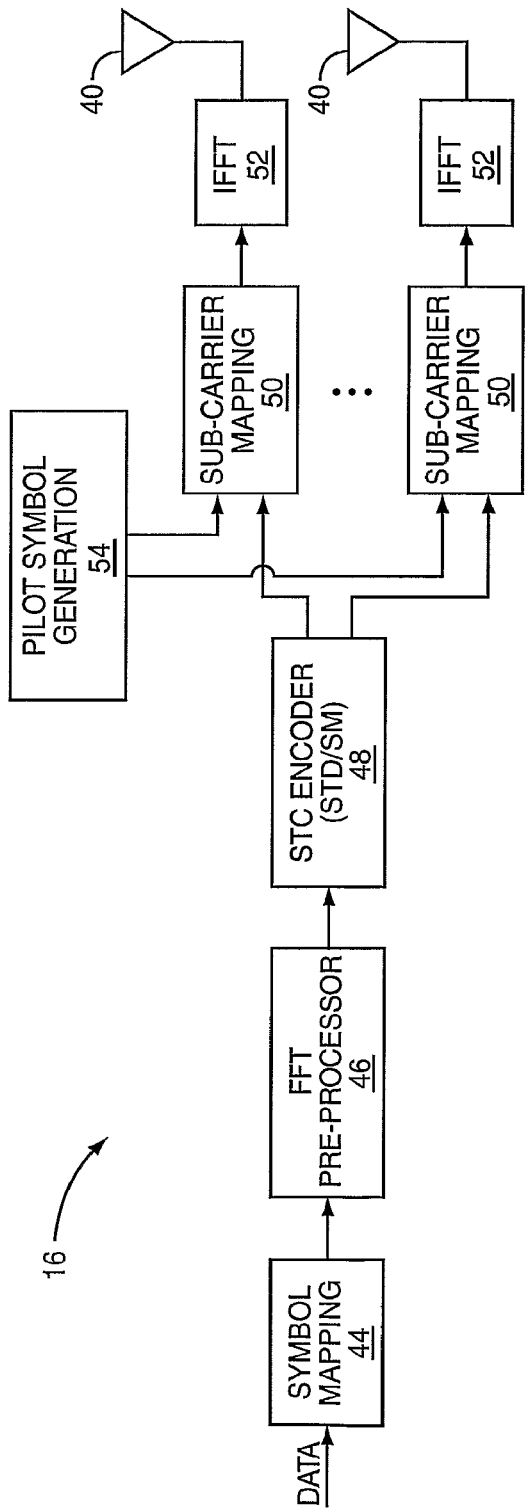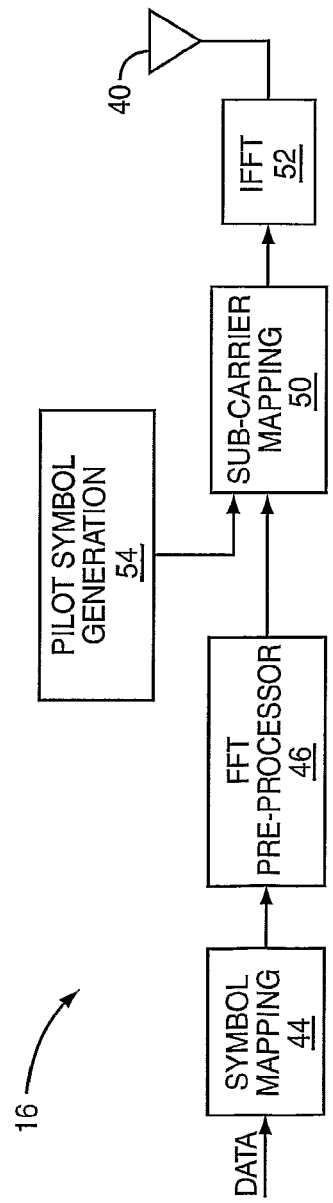
FIG. 8A
FIG. 8B

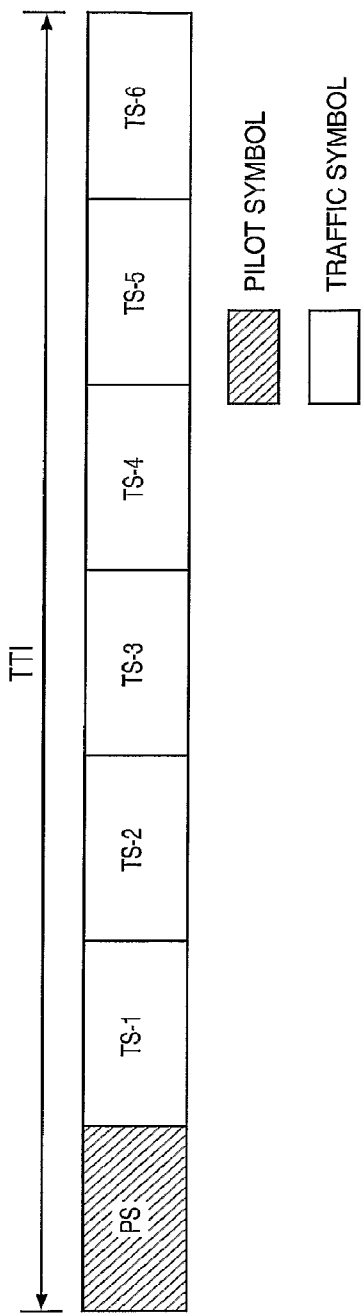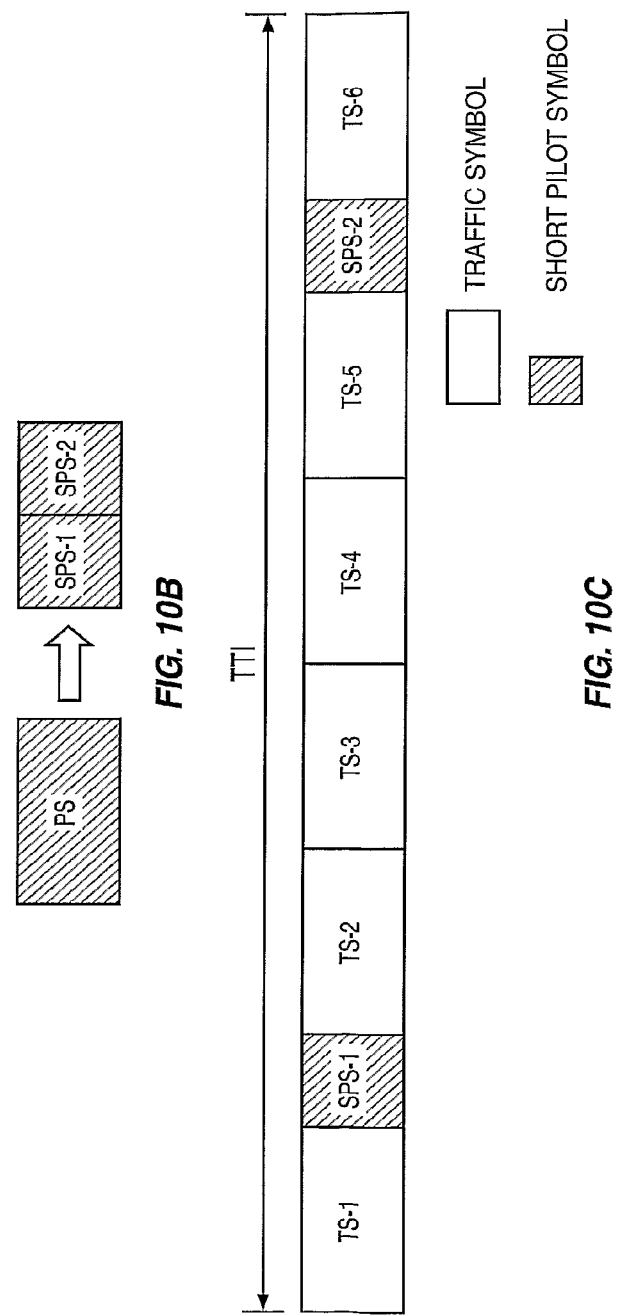

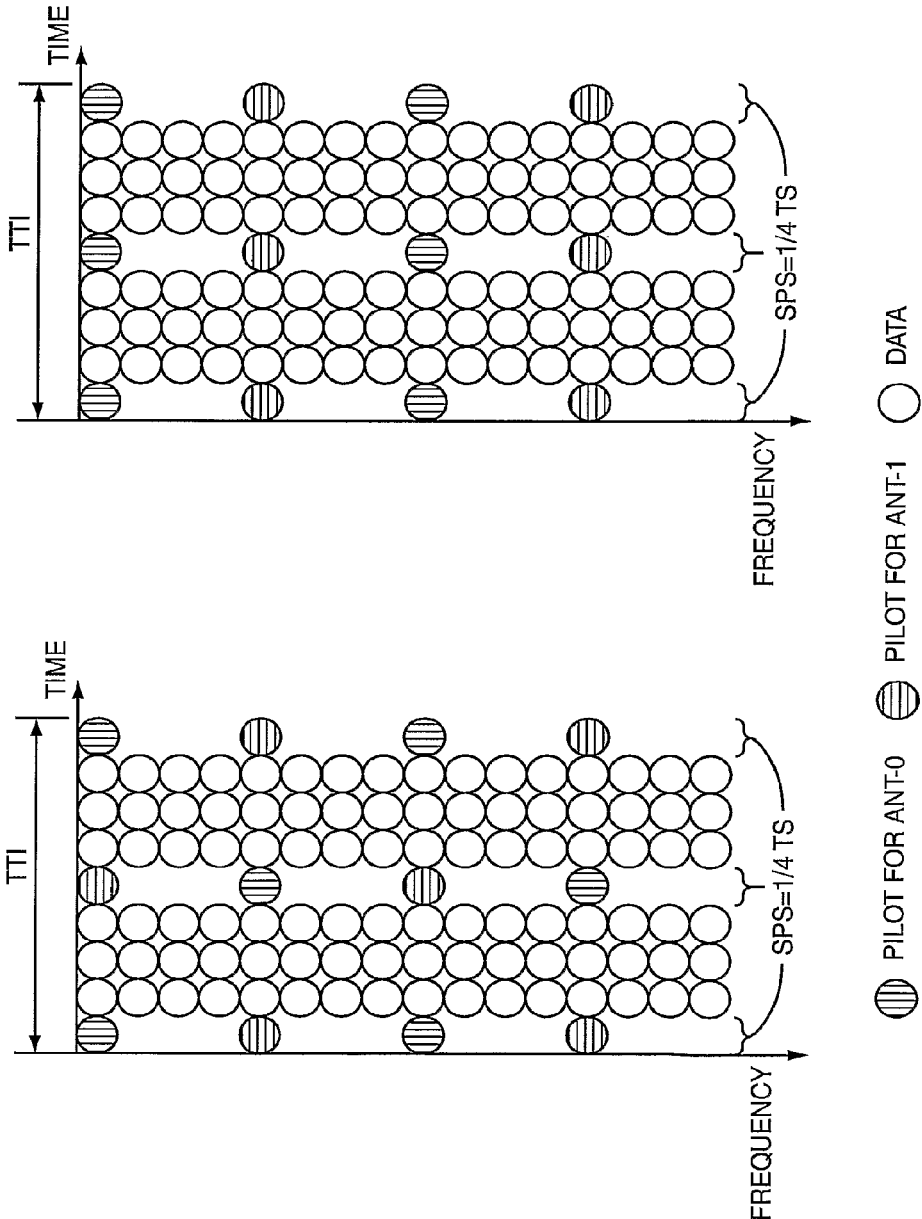

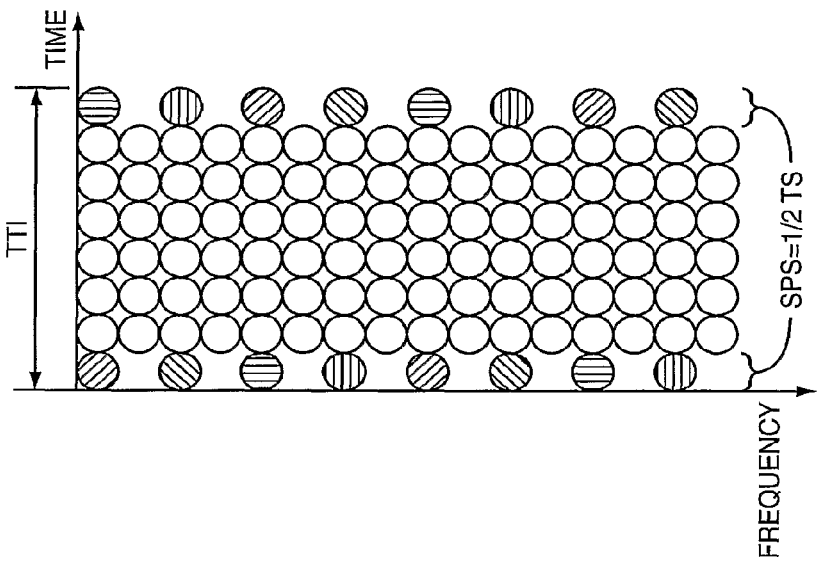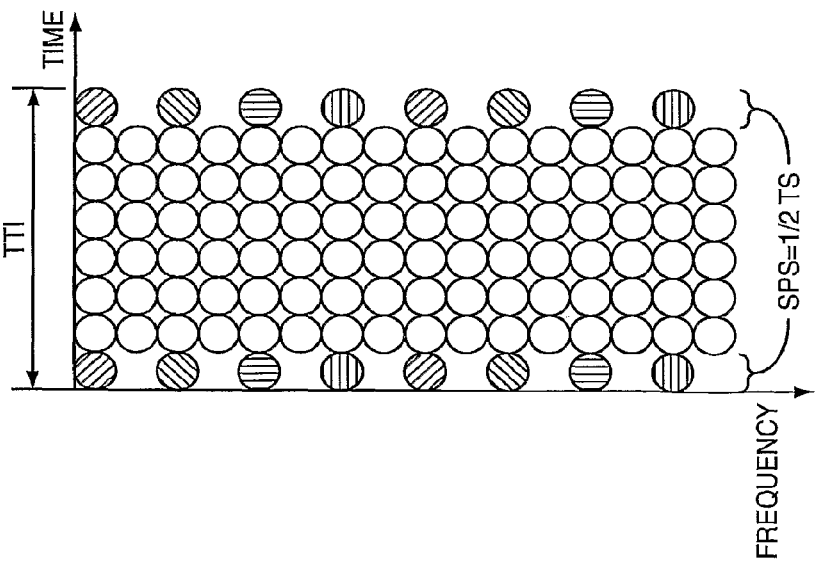

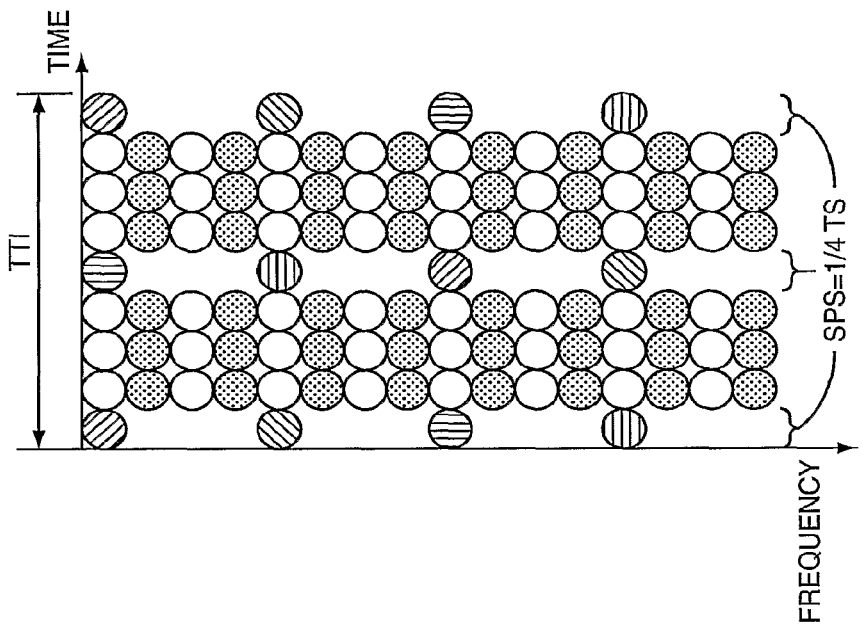
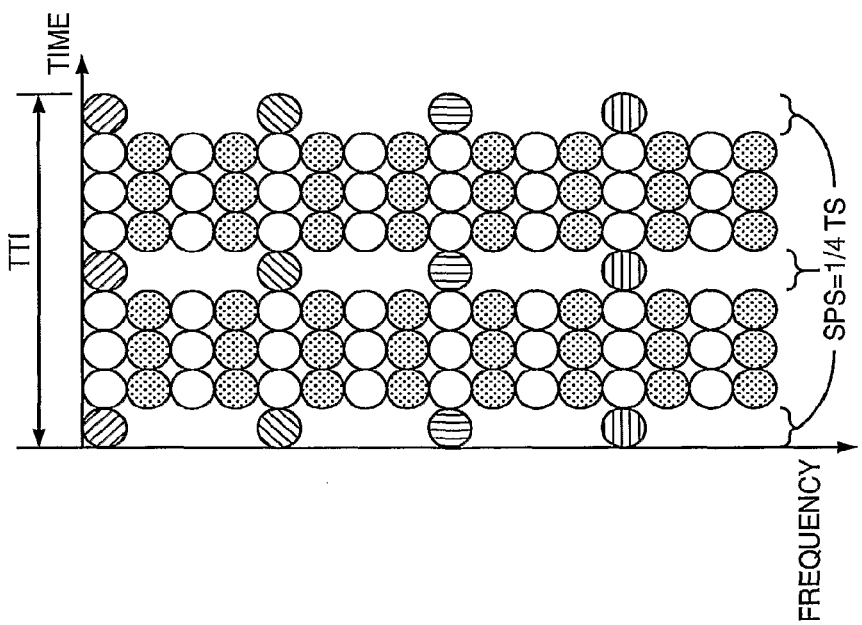

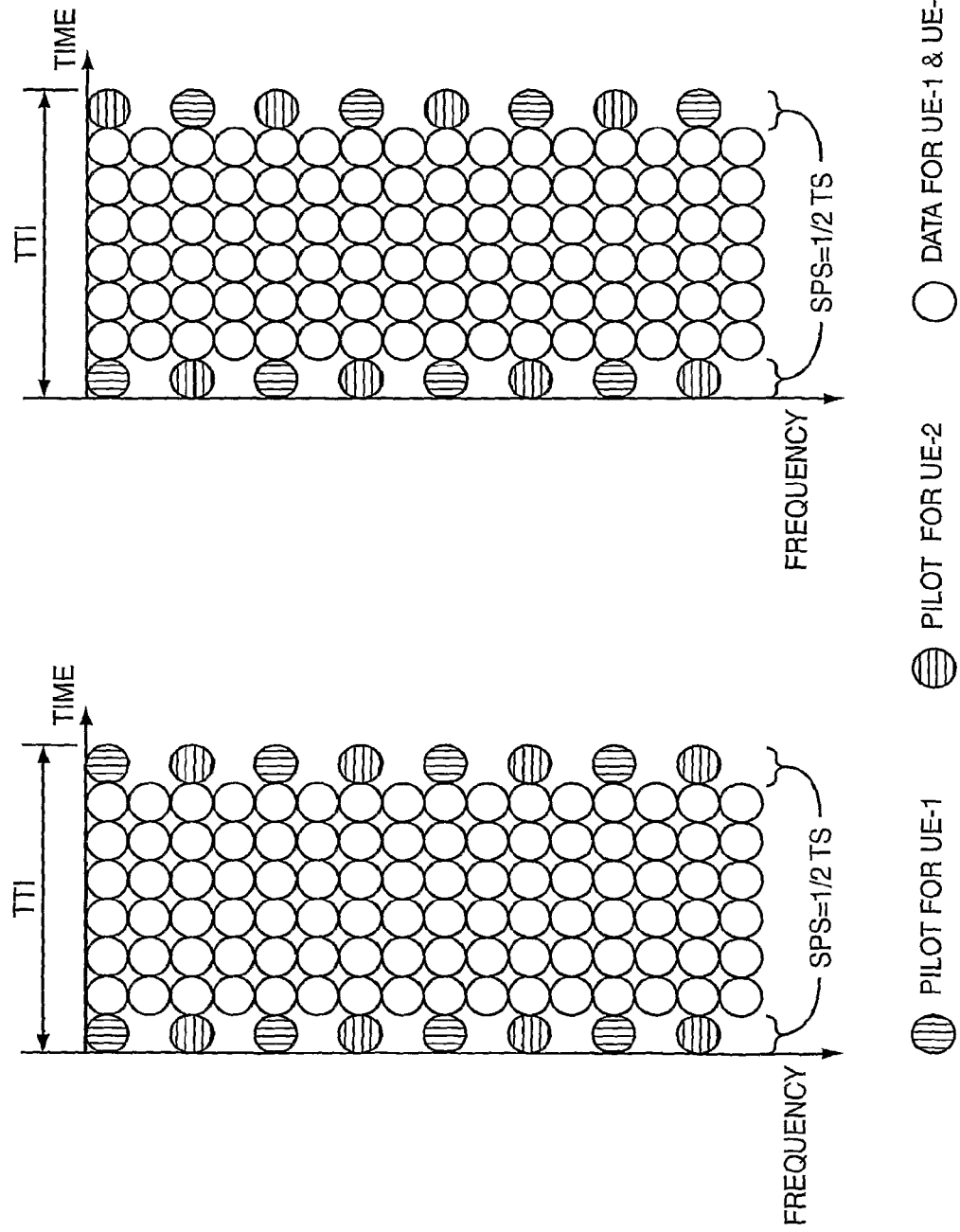

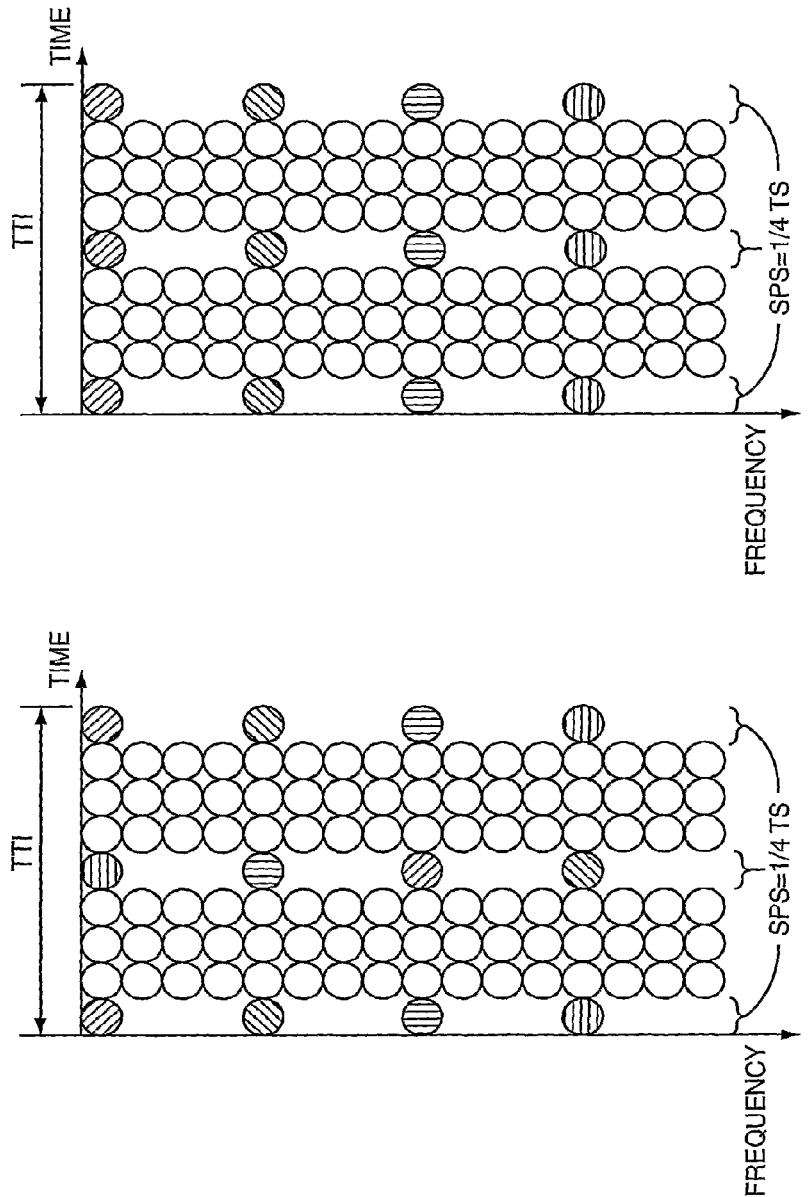

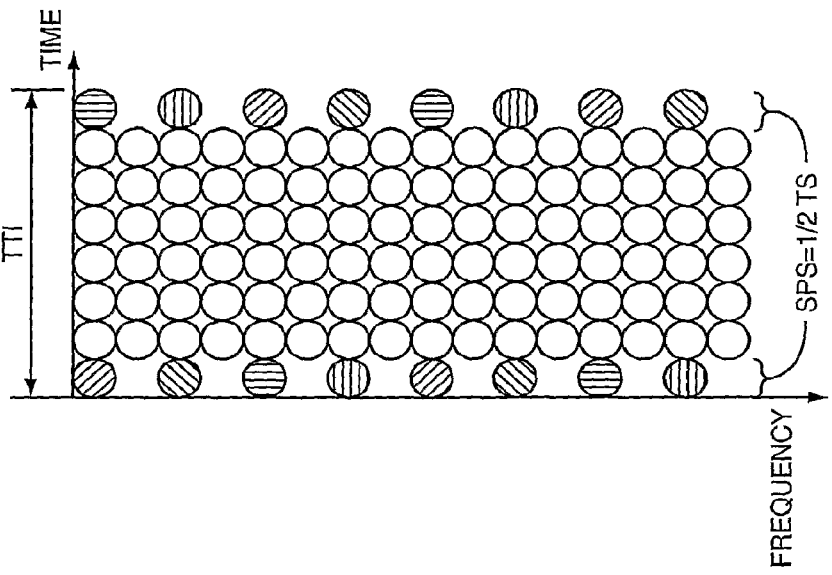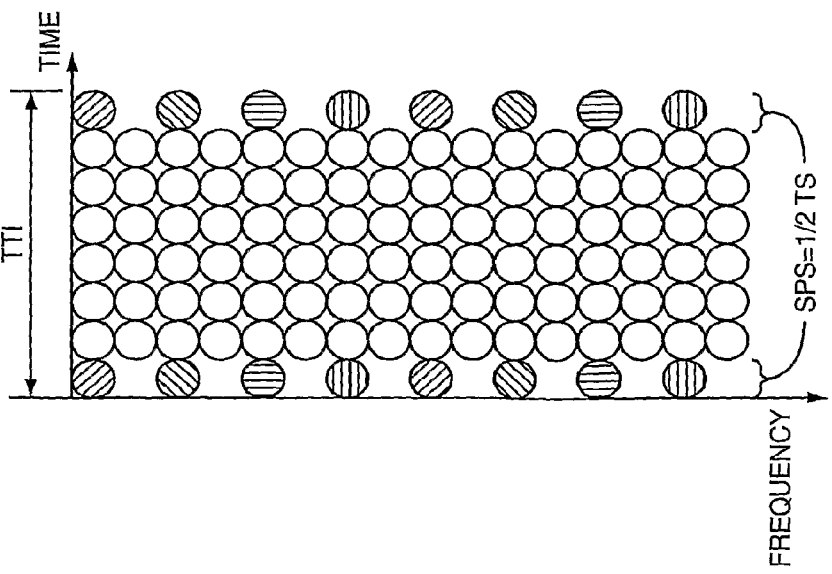

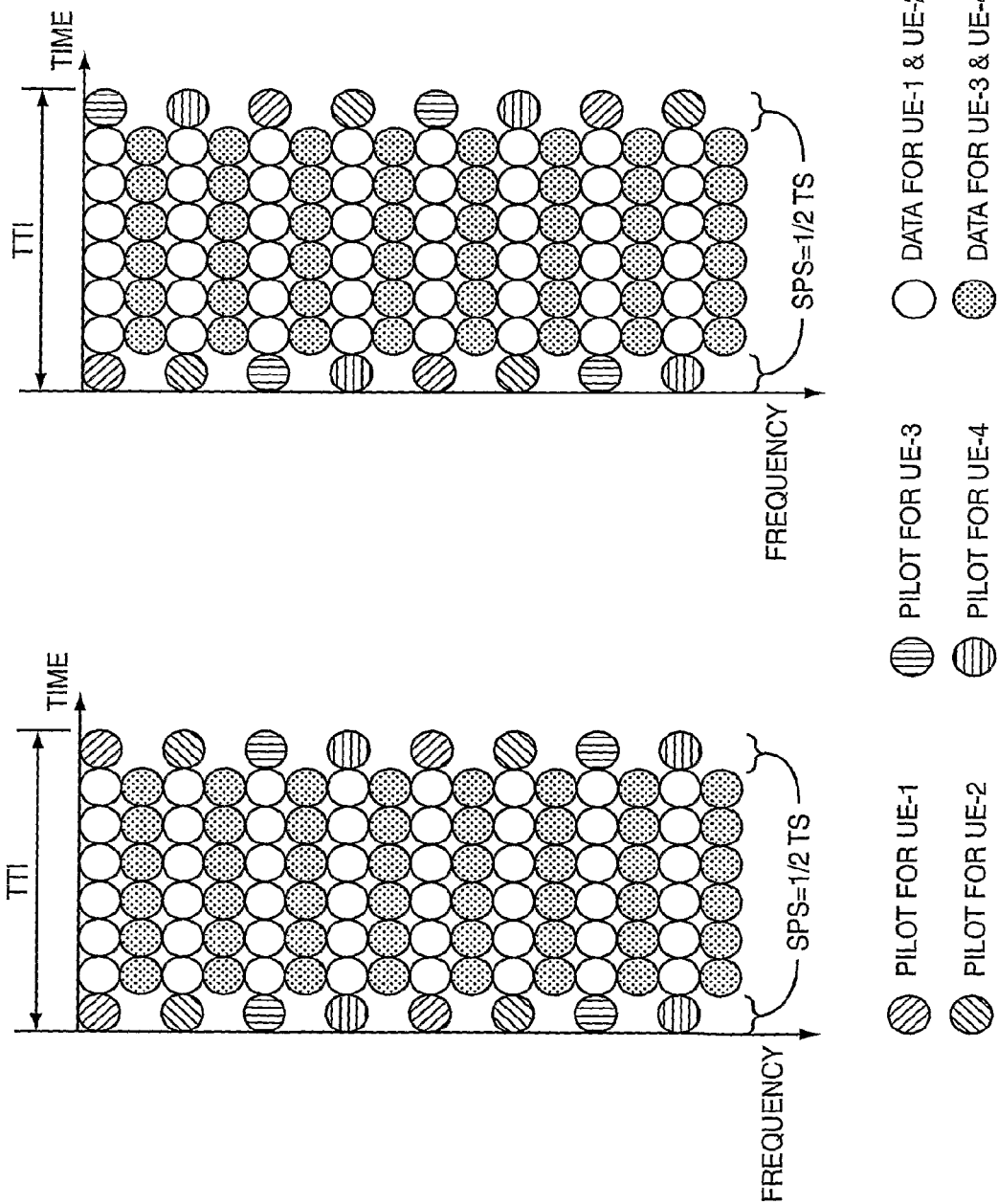

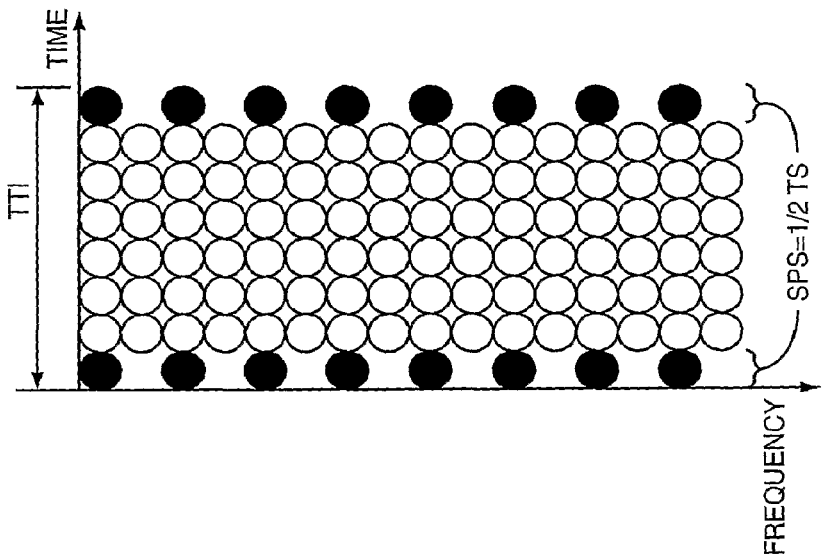
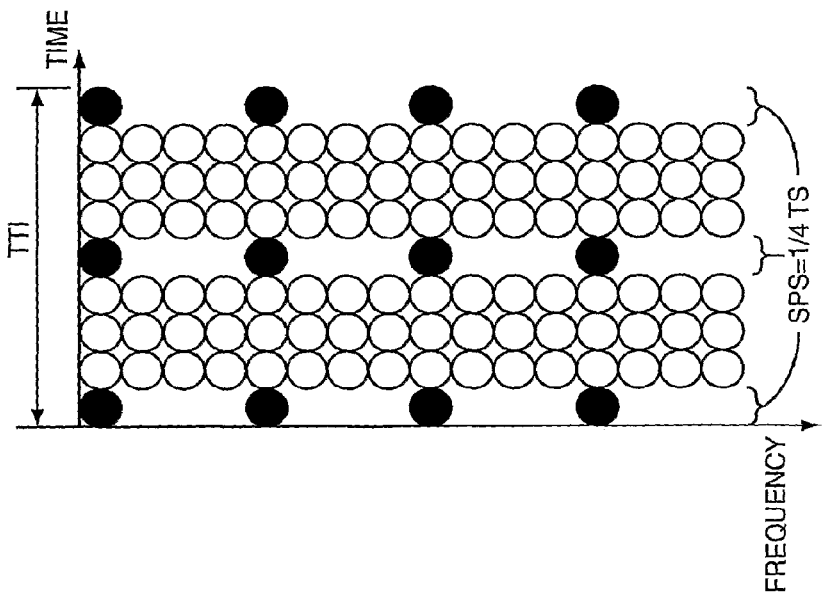

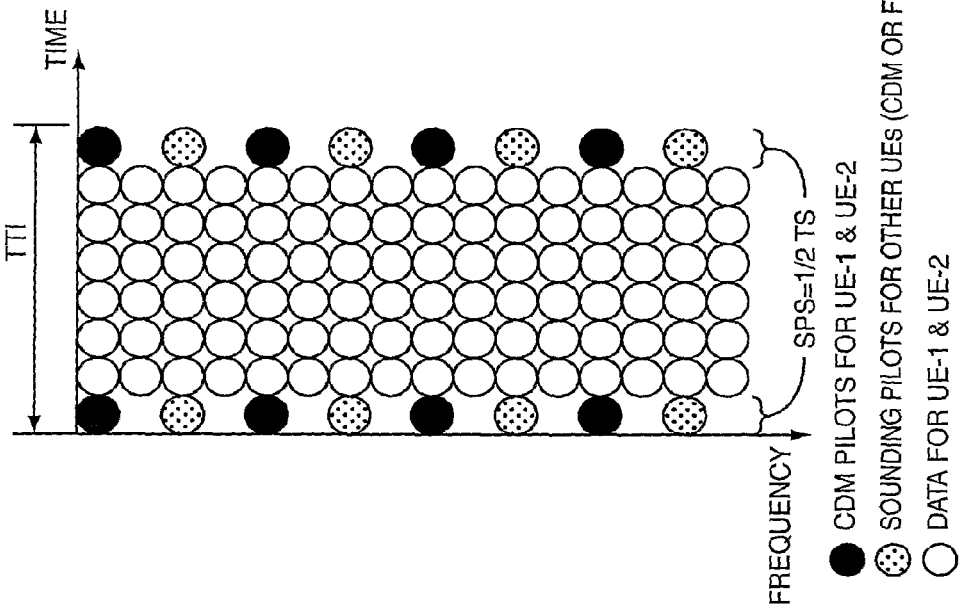
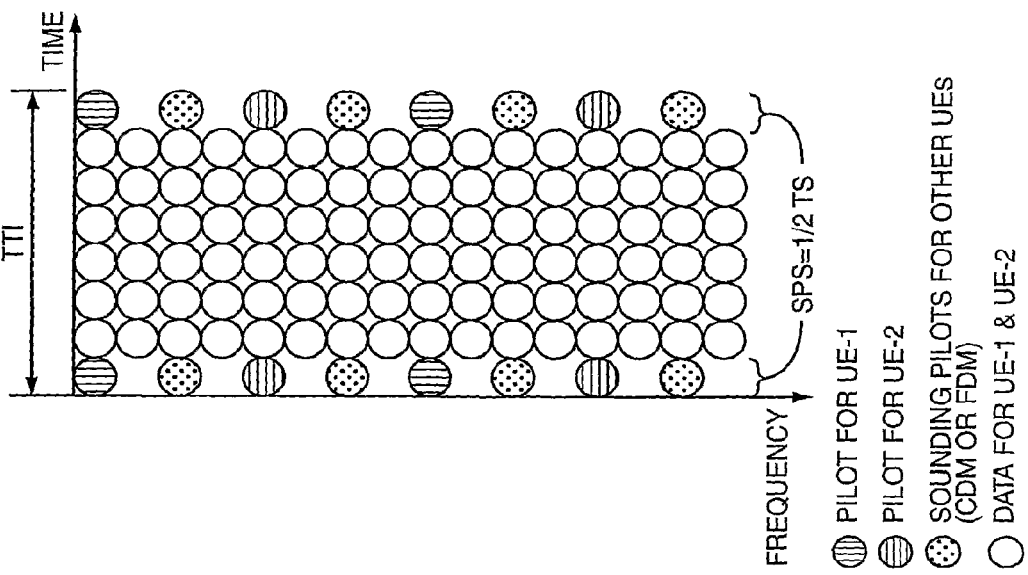

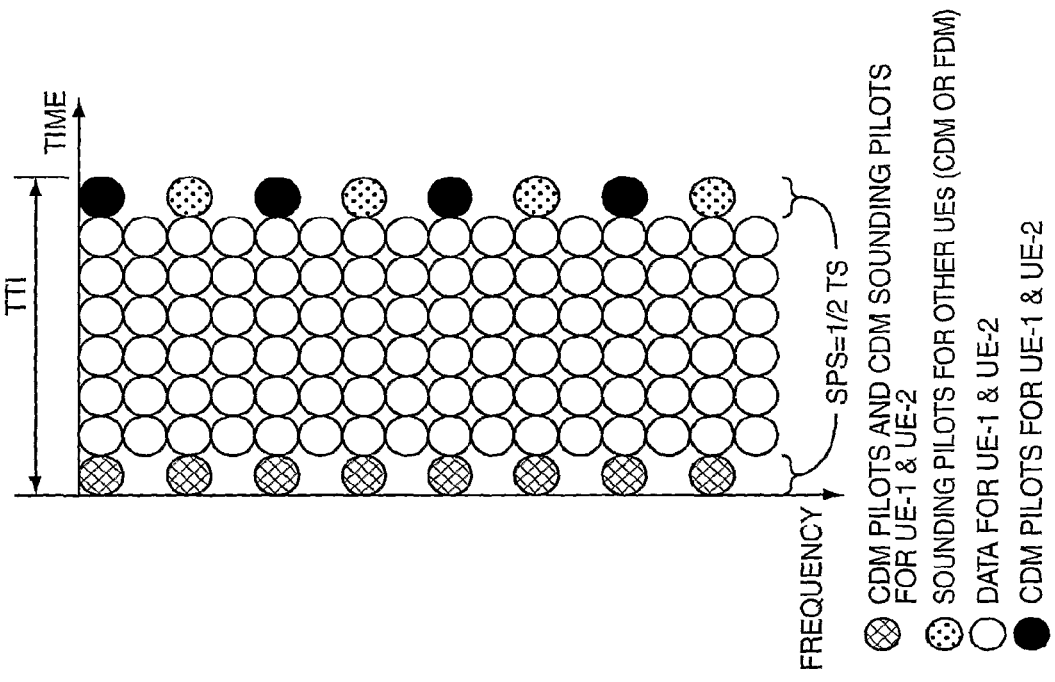
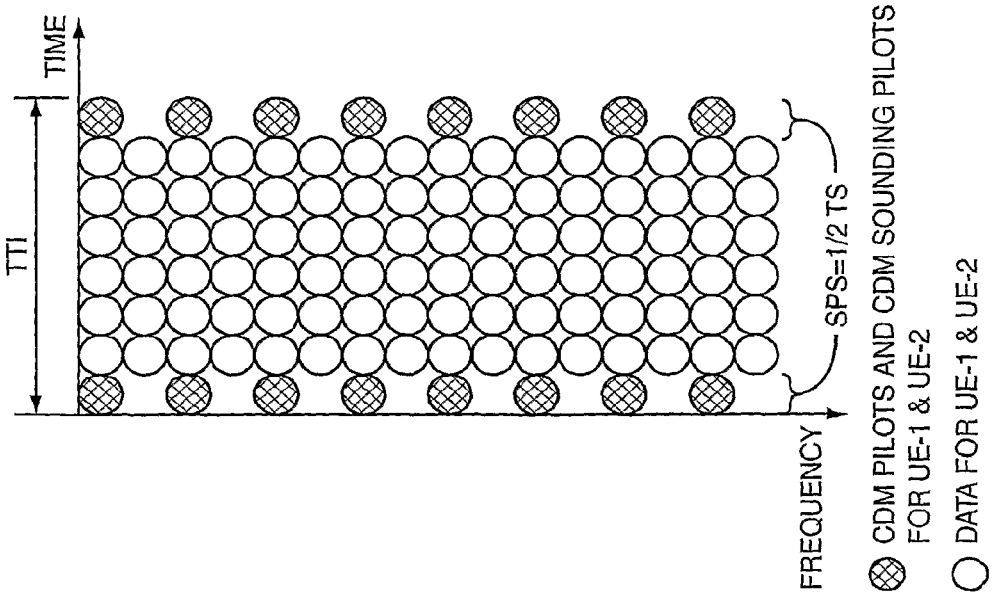

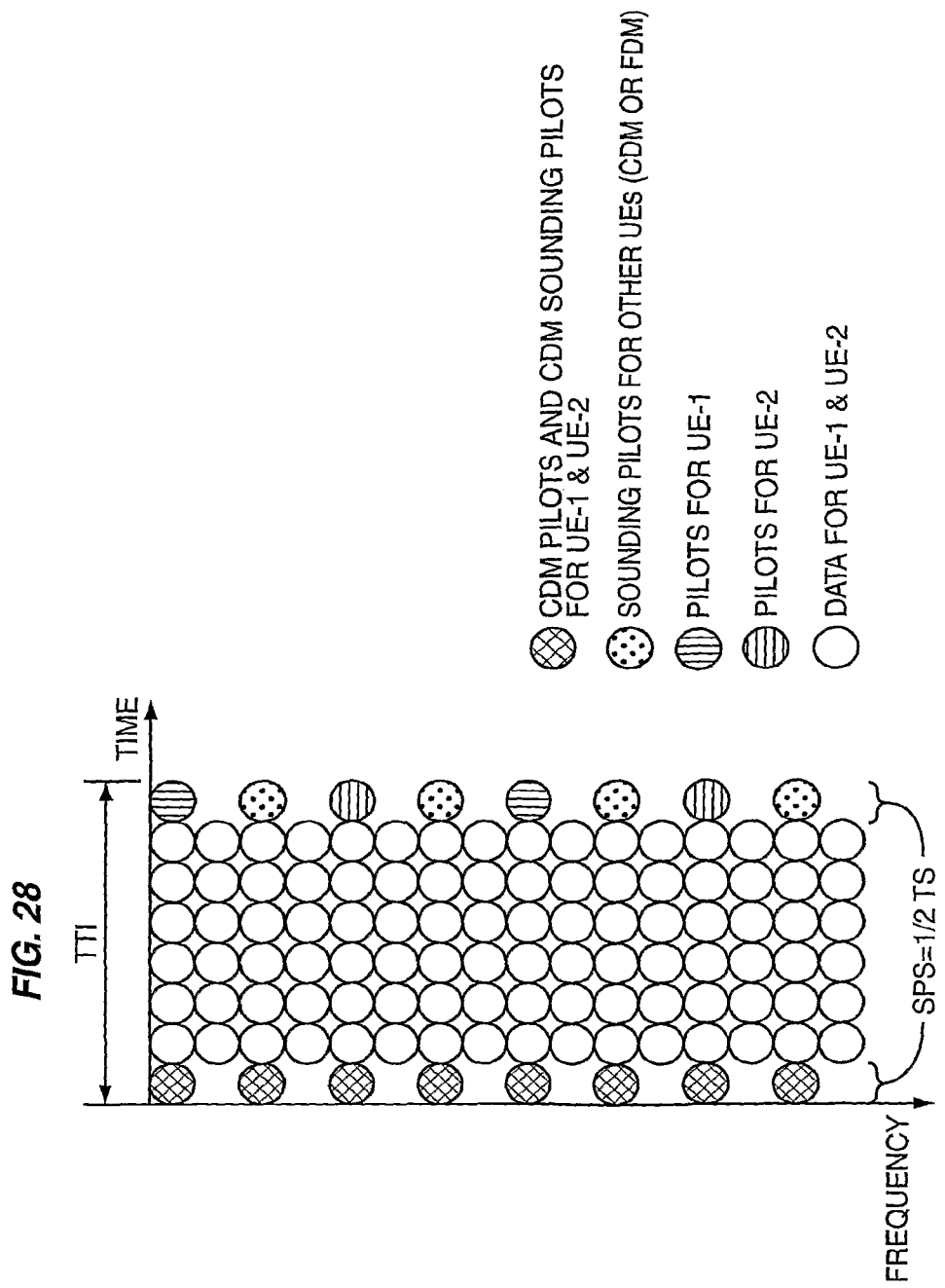

PILOT SCHEME FOR A MIMO COMMUNICATION SYSTEM

This application is a continuation of U.S. patent application Ser. No. 13/721,784, filed Dec. 20, 2012, which is a continuation of and claims priority to U.S. patent application Ser. No. 12/088,589, filed Jun. 5, 2008, which is a National Phase Application under 35 USC 371 of PCT/IB2006/002714, filed Sep. 29, 2006, which claims the benefit of U.S. provisional patent application Ser. No. 60/722,807, filed Sep. 30, 2005; and U.S. provisional patent application Ser. No. 60/824,158, filed Aug. 31, 2006, all of which are incorporated herein by reference as if set forth in their entireties.

FIELD OF THE INVENTION

The present invention relates to communications, and more particularly relates to providing a regular or virtual multiple input multiple output (MIMO) communication environment and user elements using a novel pilot signal scheme.

BACKGROUND OF THE INVENTION

With the ever-increasing demand for wireless transmission capacity based on the number of users able to access a system or the speed at which data is transferred, multiple input multiple output (MIMO) architectures have evolved. MIMO architectures incorporate multiple antennas for transmission and multiple receivers for reception. In combination with various coding techniques, the spatial diversity provided by MIMO systems provides for significant increases in the number of users that can access a system at any given time, as well as the amount of data that can be transmitted over a given period of time. Unfortunately, the nature of mobile communications dictates the need for inexpensive user elements, such as mobile telephones, wireless personal digital assistants (PDAs), and the like. Implementing multiple antennas and transmission paths within user elements significantly increases their complexity, and thus price. For certain applications, the price associated with providing multiple antennas and transmission paths in user elements has significantly outweighed the benefit of more capacity. In other applications, the benefits of MIMO-based communications warrant providing multiple antennas and transmission paths.

Most base stations are already equipped with multiple antennas and receivers, and given the nature of such infrastructure, the cost of providing such has proven largely insignificant. Thus, there exists a wireless infrastructure capable of facilitating MIMO-based communication, yet certain consumers are unwilling to bear the cost of completing the MIMO environment by buying properly equipped user elements. As such, there is a need to reap the benefit of MIMO-based communications without requiring all user elements to have multiple antennas and transmission paths. There is a further need to provide more efficient and effective ways to facilitate MIMO-based communications between base stations and different types of user elements.

SUMMARY OF THE INVENTION

The present invention employs a pilot scheme for frequency division multiple access (FDM) communication systems, such as single carrier FDM communication systems. A given transmit time interval will include numerous traffic symbols and two or more either full length or short pilot symbols. The short pilot symbols are generally spaced apart from one another by at least one traffic symbol, and will have a Fourier transform length that is less than the Fourier transform length of any given traffic symbol. In operation, multiple transmitters will generate pilot information and modulate the pilot information onto sub-carriers of the pilot symbols in an orthogonal manner. To maintain orthogonality, each transmitter may use different sub-carriers within the time and frequency domain, which is encompassed by the pilot symbols within the transmit time interval. Alternatively, each transmitter may uniquely encode the pilot information using a unique code division multiplexed code and modulate the encoded pilot information onto common sub-carriers of the pilot symbols.

Certain transmitters may have multiple transmission paths and corresponding antennas wherein each transmission path or antenna is associated with unique pilot information, which is modulated onto the sub-carriers of the pilot symbols in an orthogonal manner. Again, orthogonality may be maintained by using different sub-carriers for each transmission path or antenna for each transmitter. Alternatively, the pilot information may be encoded and modulated onto common sub-carriers. When multiple transmission paths or antennas are employed, orthogonality is maintained among the transmission paths as well as among transmitters.

Data information may be modulated onto the sub-carriers of the traffic symbols, and all or certain sub-carriers of the traffic symbols may be shared by different transmitters as well as different transmission paths of a given transmitter. Further, sounding pilots may be provided on the pilot or short pilot symbols in addition to the pilot information. Different sub-carriers may be used for sounding pilots and pilot information. If the sounding pilots are uniquely encoded, common sub-carriers of the short pilot symbols may be used. Generally, traffic information is not modulated on the pilot or short pilot symbols.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 8A is a more detailed logical representation of a transmission architecture, such as that of a user element, having multiple transmission paths and antennas according to one embodiment of the present invention.

FIG. 8B is a more detailed logical representation of a transmission architecture, such as that of a user element, having a single transmission path and antenna according to one embodiment of the present invention.

FIG. 10A illustrates a transmit time interval.

FIG. 10B illustrates division of a pilot symbol into short pilot symbols in the time domain according to one embodiment of the present invention.

FIG. 10C illustrates a transmit time interval incorporating two short pilot symbols according to a first embodiment.

FIGS. 12A and 12B illustrate two different pilot signal schemes according to a second embodiment of the present invention.

FIGS. 14A and 14B illustrate two different pilot signal schemes according to a fourth embodiment of the present invention.

FIGS. 15A and 15B illustrate two different pilot signal schemes according to a fifth embodiment of the present invention.

FIGS. 18A and 18B illustrate two different pilot signal schemes according to an eighth embodiment of the present invention.

FIGS. 19A and 19B illustrate two different pilot signal schemes according to a ninth embodiment of the present invention.

FIGS. 20A and 20B illustrate two different pilot signal schemes according to a tenth embodiment of the present invention.

FIGS. 22A and 22B illustrate two different pilot signal schemes according to a twelfth embodiment of the present invention.

FIGS. 23A and 23B illustrate two different pilot signal schemes according to a thirteenth embodiment of the present invention.

FIG. 24 illustrates a pilot signal scheme according to a fourteenth embodiment of the present invention.

FIG. 25 illustrates a pilot signal scheme according to a fifteenth embodiment of the present invention.

FIG. 26 illustrates a pilot signal scheme according to a sixteenth embodiment of the present invention.

FIG. 27 illustrates a pilot signal scheme according to a seventeenth embodiment of the present invention.

FIG. 28 illustrates a pilot signal scheme according to a eighteenth embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
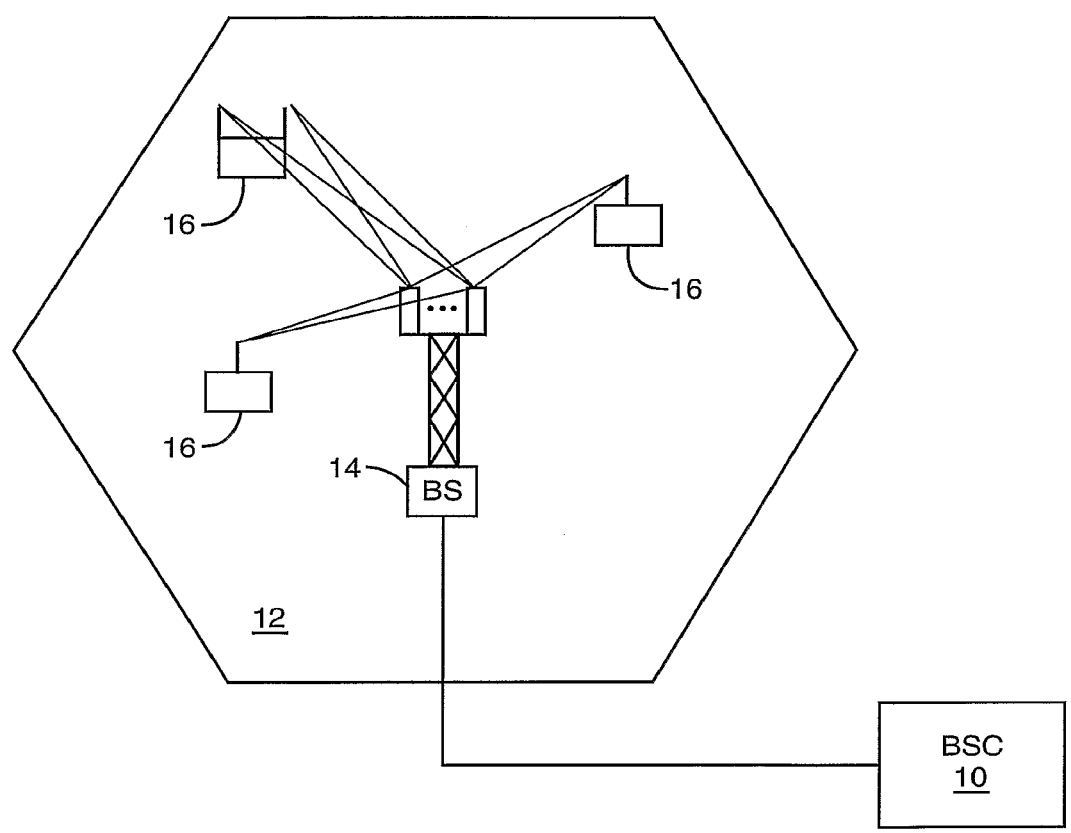
FIG. 1 is a block representation of a wireless communication environment according to one embodiment of the present invention.

With reference to FIG. 1, a basic wireless communication environment is illustrated. A base station controller (BSC) 10 controls wireless communications within multiple cells 12, which are served by corresponding base stations (BS) 14. Each base station 14 facilitates communications with user elements 16, which are within the cell 12 associated with the corresponding base station 14. For the present invention, the base stations 14 include multiple antennas to provide spatial diversity for communications. The user elements 16 may or may not have multiple antennas, depending on the implementation of the present invention.

Figure 2:
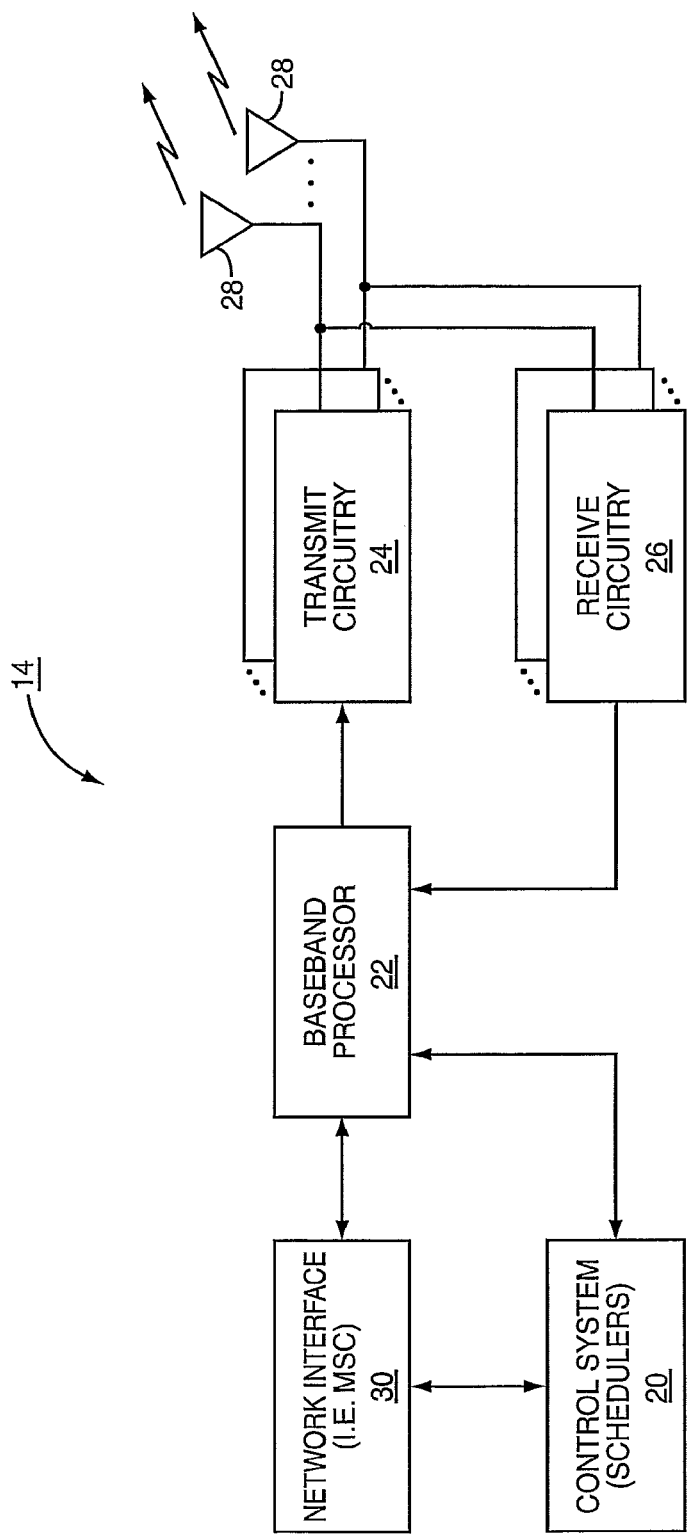
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through the antennas 28 bearing information from one or more remote transmitters provided by user elements 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another user element 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
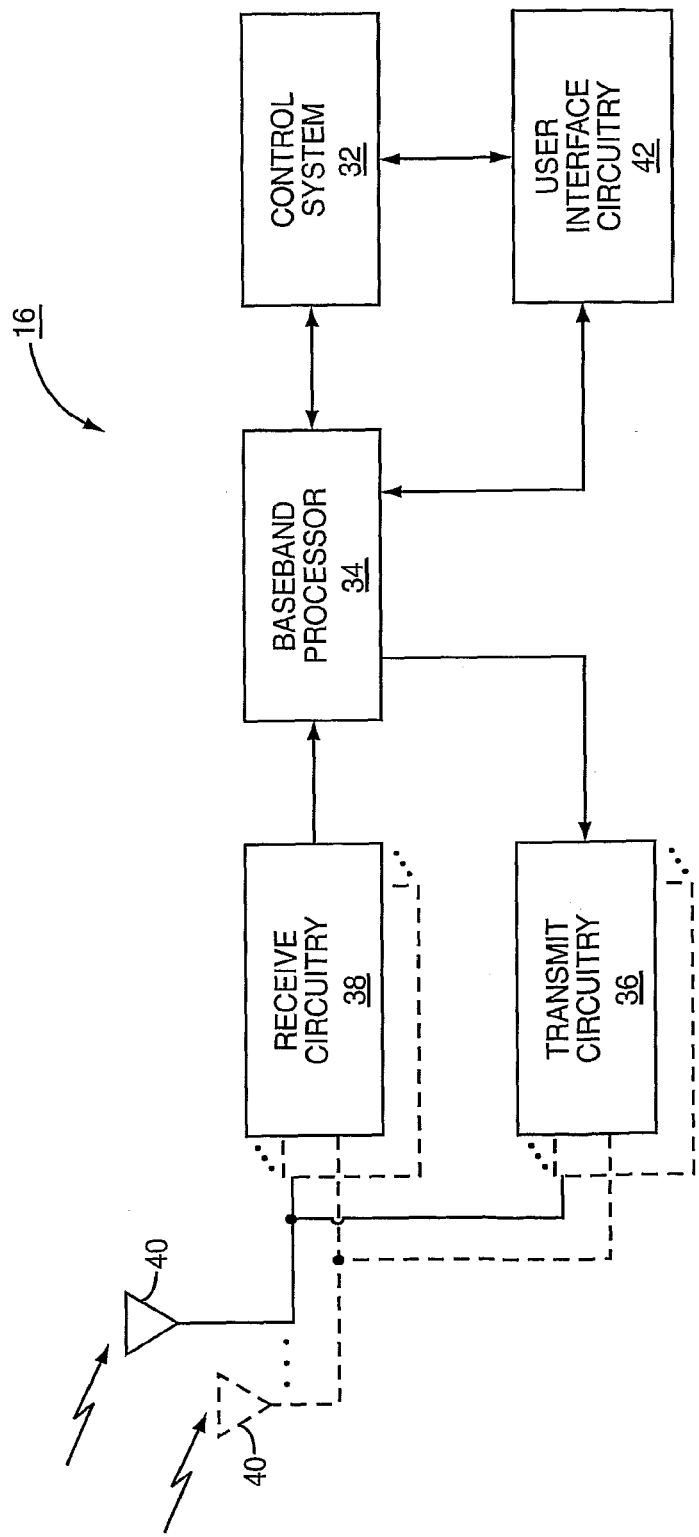
FIG. 3 is a block representation of a user element according to one embodiment of the present invention.

With reference to FIG. 3, a user element 16 configured according to one embodiment of the present invention is illustrated. Similarly to the base station 14, the user element 16 will include a control system 32, a baseband processor 34, transmit circuitry 36, receive circuitry 38, antenna 40, and user interface circuitry 42. The receive circuitry 38 receives radio frequency signals through the antenna 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antenna 40 through a matching network (not shown). In select embodiments, multiple antennas 40 and replicated transmit and receive circuitries 36, 38 provide spatial diversity.

The present invention supports MIMO communications between base stations 14 and user elements 16 that have multiple transmission paths and corresponding antennas 40. Additionally, virtual MIMO communications are supported between base stations 14 and multiple user elements 16, at least one of which only has a single transmission path and antenna 40. In this case, the multiple user elements 16 cooperate to transmit data to the base station 14 to emulate MIMO communications.

MIMO communications generally employ some form of space-time coding on the data to be transmitted to enable the data to be transmitted using shared transmission resources. The particular space-time coding employed dictates what data is to be transmitted over a given one of the antennas as well as when the data is to be transmitted using the shared resources. Popular types of space-time coding include spatial multiplexing (SM) and space-time diversity (STD). Spatial multiplexing relates to transmitting different data from different antennas where the same data is not transmitted from different antennas. Spatial multiplexing is used to increase throughput or transmission rates in the present of favorable channel conditions. Space-time diversity relates to transmitting the same data over different antennas, often at different times. The inherent redundancy of spatial multiplexing increases the robustness of communications under challenging channel conditions or for data requiring additional robustness at the expense of transmission rates.

In one embodiment of the present invention, a single carrier frequency division multiple access (SC-FDM) technique is used for transmissions. Other multiple access technologies, such as orthogonal frequency division multiple access (OFDM) techniques may also be used with the present invention. Providing a MIMO architecture enabling multiple transmission paths can increase channel capacity by allowing multiple users to share the same channels, increase data rates, or a combination thereof. Further information regarding space-time diversity and special multiplexing is provided in commonly owned and assigned U.S. patent application Ser. No. 09/977,540 filed Oct. 15, 2001, Ser. No. 10/251,935 filed Sep. 20, 2002, Ser. No. 10/261,739 filed Oct. 1, 2002, and Ser. No. 10/263,268 filed Oct. 2, 2002, the disclosures of which are incorporated herein by reference in their entireties.

Figure 4:
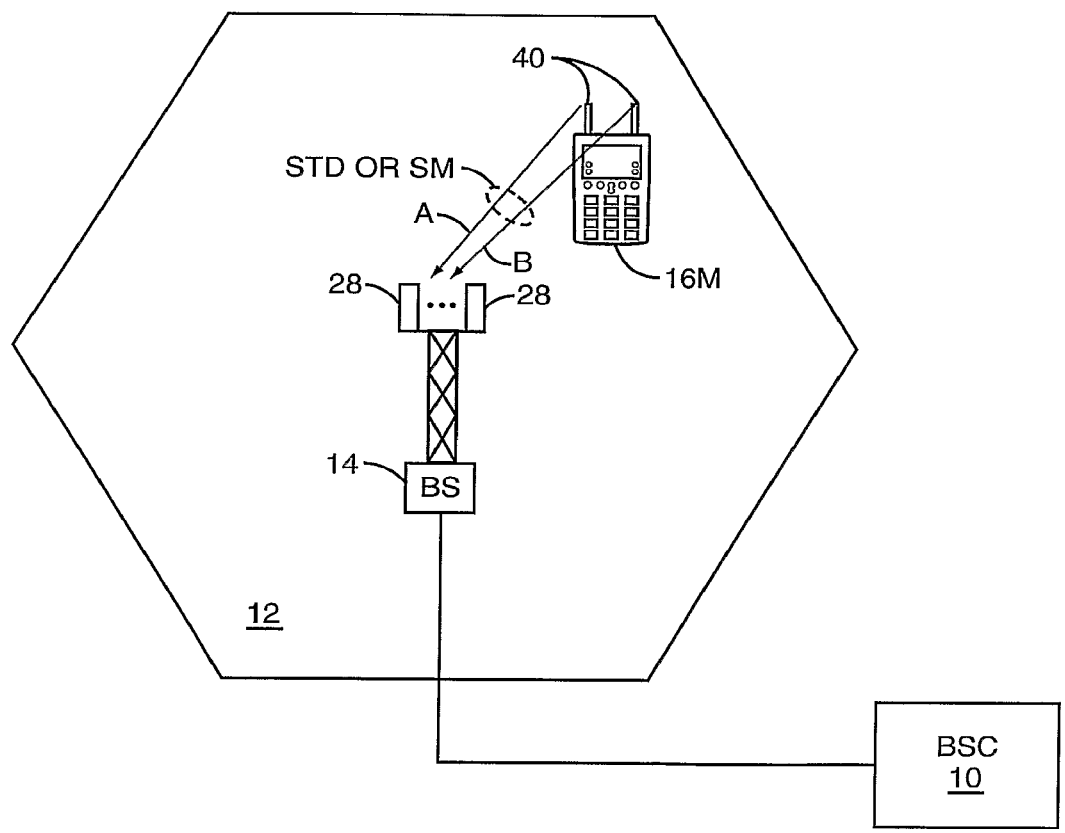
FIG. 4 is a block representation of a wireless communication environment providing a first space-time coding scheme according to one embodiment of the present invention.

With reference to FIG. 4, a MIMO communication environment is depicted wherein a user element 16M, which has two antennas 40, uses MIMO communications for uplink transmissions to the base station 14. The base station 14 has at least two antennas 28. As illustrated, the MIMO communications may employ spatial multiplexing where different data is transmitted from each antenna 40 of user element 16M, or space-time diversity where the same data is transmitted from each antenna 40 at different times.

Figure 5:
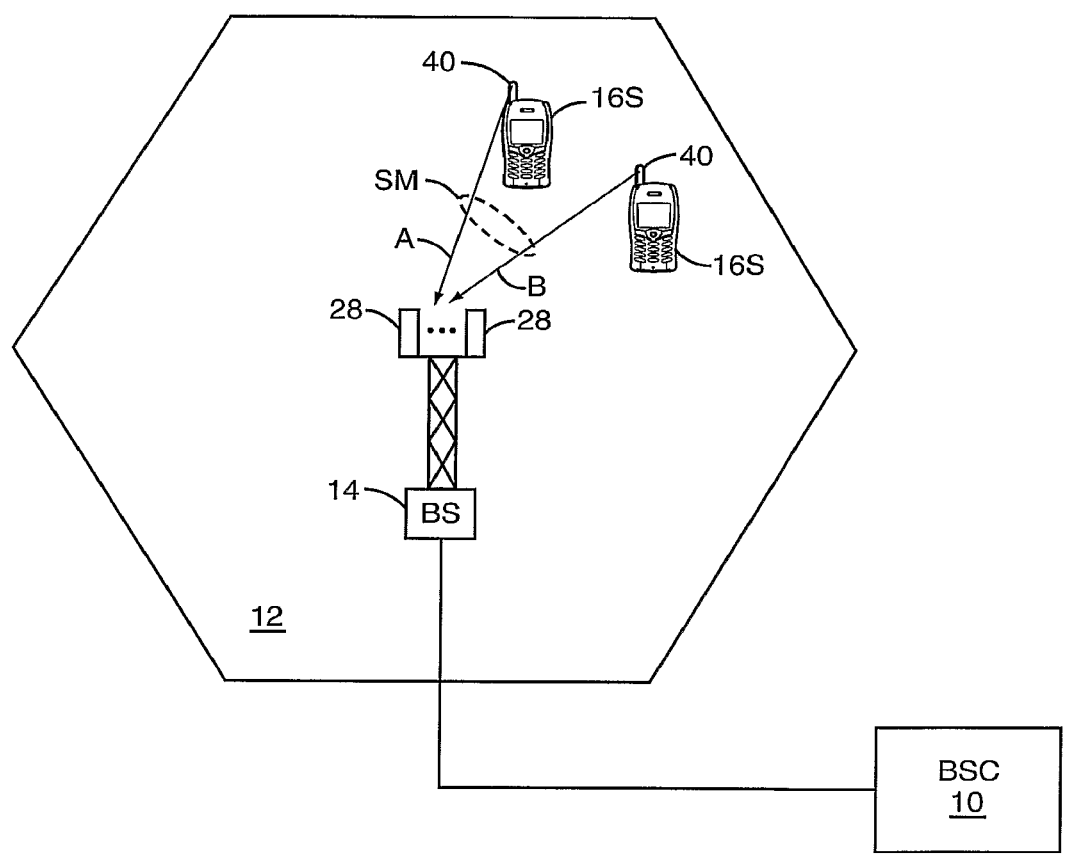
FIG. 5 is a block representation of a wireless communication environment providing a second space-time coding scheme according to one embodiment of the present invention.

With reference to FIG. 5, a MIMO communication environment is depicted wherein different user elements 16S, which have only one antenna 40 each, use collaborative MIMO communications for uplink transmissions to the base station 14. The base station 14 has at least two antennas 28. As illustrated, the MIMO communications employ spatial multiplexing where different data is transmitted from the different user elements 16M using the same transmission resources. Additional information regarding collaborative, or virtual, MIMO communications is provided in commonly owned and assigned U.S. application Ser. No. 10/321,999, filed Dec. 16, 2002, the disclosure of which is incorporated herein by reference in its entirety.

Figure 6:
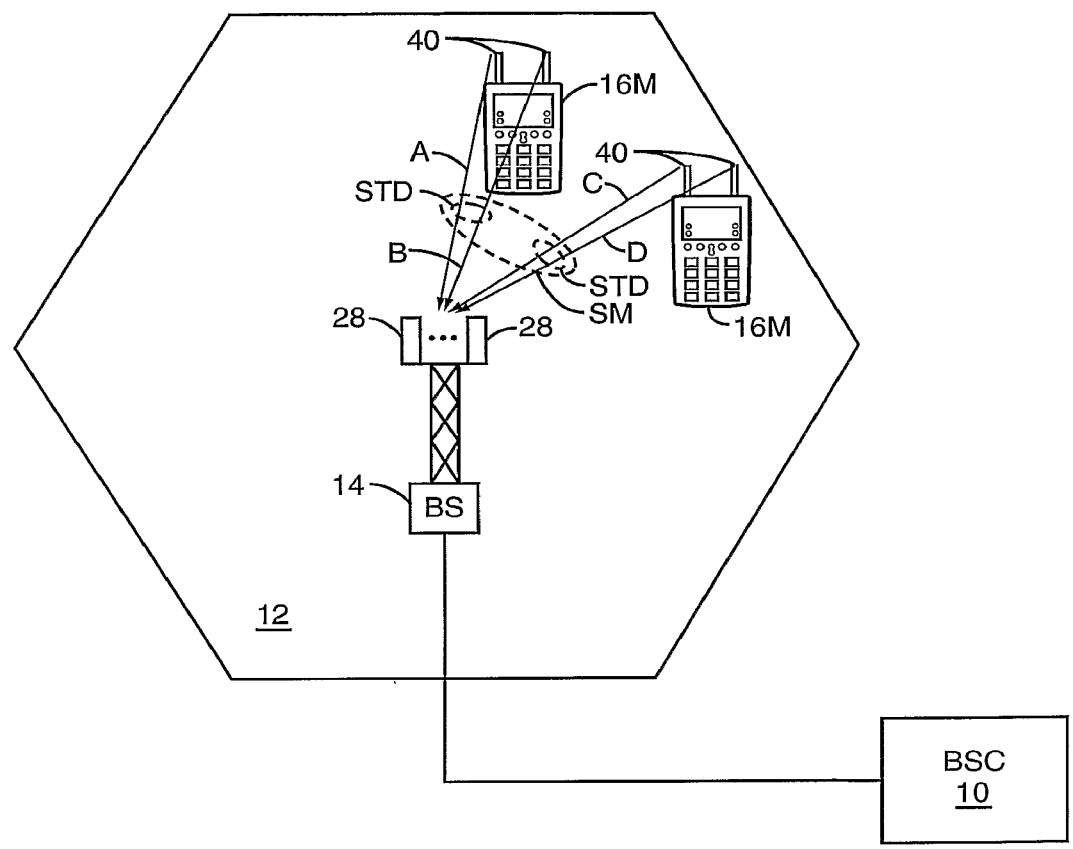
FIG. 6 is a block representation of a wireless communication environment providing third space-time coding scheme according to one embodiment of the present invention.

With reference to FIG. 6, a MIMO communication environment is depicted wherein different user elements 16M, which have two antennas 40 each, use collaborative MIMO communications for uplink transmissions to the base station 14. The base station 14 has at least two antennas 28. As illustrated, the MIMO communications from each of the user elements 16M employ space-time diversity, wherein the same data is transmitted from the different antennas 40 at different times for each of the user elements 16M using the same transmission resources. However, different data is being transmitted from each user element 16M. As such, the base station 14 may process the received signals as spatially multiplexed signals.

Figure 7:
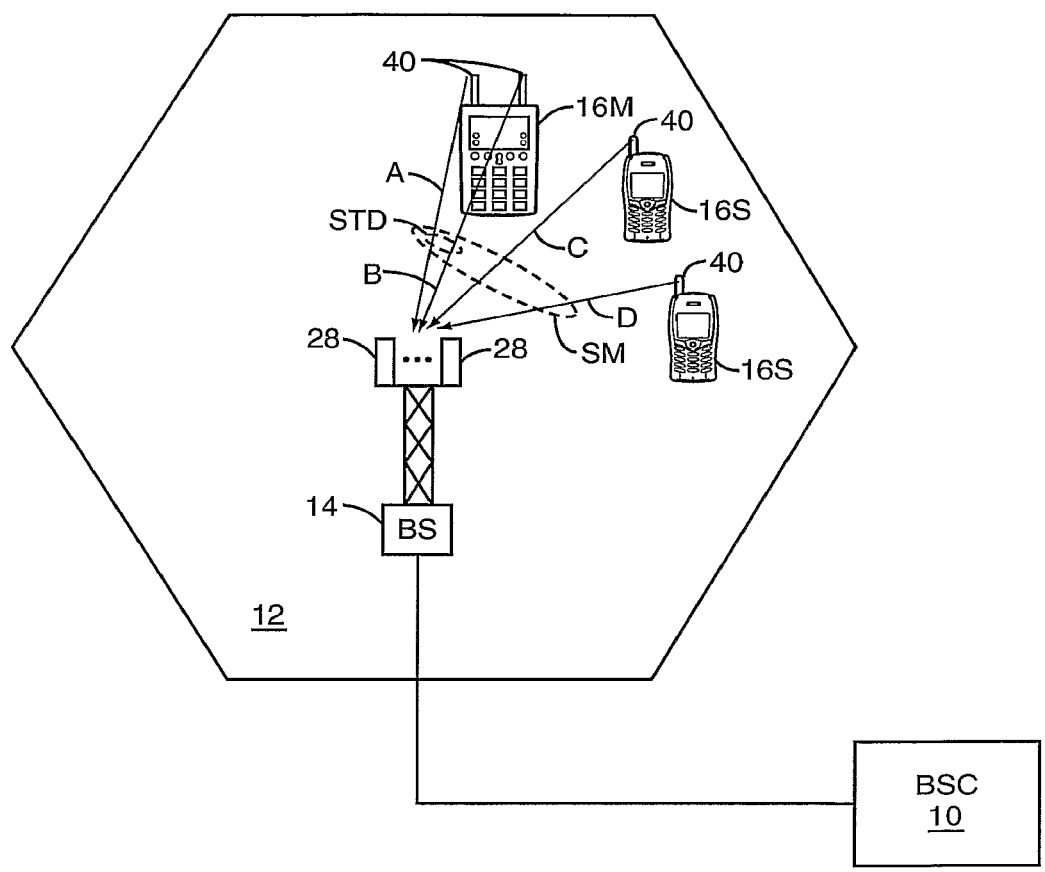
FIG. 7 is a block representation of a wireless communication environment providing a fourth space-time coding scheme according to one embodiment of the present invention.

With reference to FIG. 7, a MIMO communication environment is depicted wherein two user elements 16S and one user element 16M use collaborative MIMO communications for uplink transmissions to the base station 14. The user elements 16S have one antenna 40 each while the user element 16M has two antennas 40. The base station 14 has at least two antennas 28. As illustrated, the MIMO communications from the user element 16M employ space-time diversity where the same data is transmitted from each antenna 40 of the user element 16M at different times. The MIMO communications from each of the user elements 16S employ spatial multiplexing where different data is transmitted from each antenna 40 of the mobile terminals 16S. Notably, since the data transmitted from user element 16M is different than that transmitted for either of user elements 16S, each of the user elements 16S and the user element 16M are collaborating to effectively provide spatial multiplexing with respect to one another. This is the case even though user element 16M is using space-time diversity for its data transmissions.

Turning now to FIGS. 8A and 8B, a logical transmission architecture for SC-FDM communications is provided for a multiple antenna embodiment and a single antenna embodiment. For clarity and conciseness, only select functions are illustrated, even though other functions are described to provide context. With particular reference to FIG. 8A, data to be transmitted is provided to a symbol mapping function 44, which systematically maps the bits of the data into corresponding symbols depending on a chosen baseband modulation technique. As an example, the baseband modulation may include a form of Quadrature Amplitude Modulation (QAM) or Quadrature Phase Shift Key (QPSK) modulation.

At this point, groups of bits representing the data to be transmitted have been mapped into symbols representing locations in an amplitude and phase constellation and are ready to be modulated. For SC-FDM modulation, the symbols are presented to a Fast Fourier Transform (FFT) pre-processor function 46, which operates to provide some form of discrete FFT on the symbols. The FFT data is then presented to a space-time code (STC) encoder 48 that will encode the FFT data according to the desired space-time encoding technique, such as spatial multiplexing or space-time diversity. The resultant space-time encoded data is then presented to the respective sub-carrier mapping function 50 in light of the space-time encoding. The sub-carrier mapping function 50 is tasked with mapping the space-time encoded FFT data to appropriate sub-carriers in the time-frequency continuum provided by the SC-FDM resource, which is described below in greater detail. For space-time diversity encoding, the space-time encoded FFT data will be presented to the different sub-carrier mapping functions 50 at different times. For spatial multiplexing, different space-time encoded FFT data is presented to different sub-carrier mapping functions 50. The sub-carrier mapping essentially maps samples of the space-time encoded FFT data to an appropriate input of one of the inverse FFT (IFFT) processors 52, which operate on the space-time encoded FFT data using an inverse discrete Fourier transform (IDFT) or like processing to provide an Inverse Fourier Transform.

Each of the resultant signals is then up-converted in the digital domain to an intermediate frequency and converted to an analog signal via corresponding digital up-conversion (DUC) circuitry and digital-to-analog (D/A) conversion circuitry (not shown). The resultant analog signals are then simultaneously modulated at the desired RF frequency, amplified, and transmitted via RF circuitry and the antennas 40.

Notably, the transmitted data may include pilot signals, which were previously assigned by the base station 14. The base station 14, which is discussed in detail below, may use the pilot signals for channel estimation and interference suppression, as well as to identify the user element 16. The pilot symbols are created by a pilot symbol generation function 54 and presented to the different sub-carrier mapping functions 50, which will map the pilot symbols to appropriate sub-carriers along with the space-time encoded FFT data. As such, the IFFT processors 52 effectively modulate the FFT data and the pilot information onto desired sub-carriers of an SC-FDM signal.

With particular reference to FIG. 8B, data to be transmitted is provided to the symbol mapping function 44, which systematically maps the bits of the data into corresponding symbols depending on a chosen baseband modulation technique.

For SC-FDM modulation, the symbols are presented to the FFT pre-processor function 46, which operates to provide some form of an FFT on the symbols. The resultant FFT data is then presented to the sub-carrier mapping function 50, which will mapping the FFT data to appropriate sub-carriers in the time-frequency continuum provided by the SC-FDM resource. The sub-carrier mapping essentially maps samples of the FFT data to an appropriate input of one of the IFFT processors 52, which operate on the FFT data using IDFT or like processing to provide an Inverse Fourier Transform.

Each of the resultant signals is then up-converted in the digital domain to an intermediate frequency and converted to an analog signal via corresponding digital up-conversion (DUC) circuitry and digital-to-analog (D/A) conversion circuitry. The resultant analog signals are then simultaneously modulated at the desired RF frequency, amplified, and transmitted via RF circuitry and the antenna 40.

As noted above, the transmitted data may include pilot signals, which were previously assigned by the base station 14. The base station 14 may use the pilot signals for channel estimation and interference suppression, as well as to identify the user element 16. The pilot symbols are created by a pilot generation function 54 and presented to the different sub-carrier mapping function 50, which will map the pilot symbols to appropriate sub-carriers along with the FFT data. As such, the IFFT processors 52 effectively modulate the FFT data and the pilot symbols into desired sub-carriers of the SC-FDM signal.

Those skilled in the art will recognize that the order of the FFT and IFFT functions of the pre-processor and modulation blocks may be reversed. For example, the symbols may be presented to an IFFT pre-processor function, which operates to provide some form of an IFFT on the symbols. The resultant IFFT data is then presented to the sub-carrier mapping function 50, which will map the IFFT data to appropriate sub-carriers in the time-frequency continuum provided by the SC-FDM resource. The sub-carrier mapping essentially maps samples of the IFFT data to an appropriate input of one of FFT processors, which operate on the IFFT data using an FFT or like processing to provide a Fourier Transform. On the receive side, the signals are initially presented to an IFFT and then to an FFT to recover the transmitted data.

Figure 9:
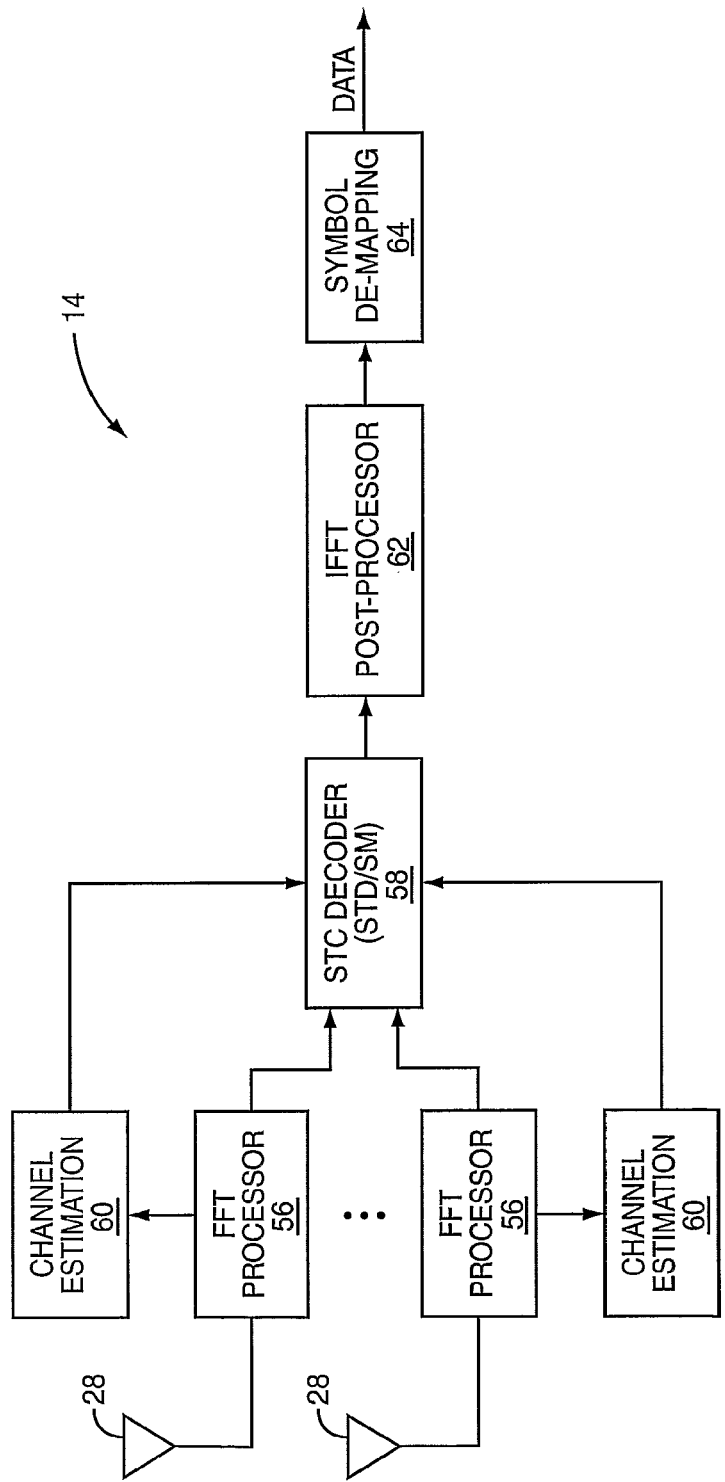
FIG. 9 is a more detailed logical representation of a receiver architecture, such as that of a base station, having a multiple receive paths and antennas according to one embodiment of the present invention.

Turning now to FIG. 9, a logical receiver architecture for SC-FDM communications is provided for a multiple antenna embodiment. For clarity and conciseness, only select functions are illustrated, even though other functions are described to provide context. Upon arrival of the transmitted signals at each of the antennas 28, the respective signals are demodulated and amplified by corresponding RF circuitry. For the sake of conciseness and clarity, only one of the multiple receive paths in the receiver architecture is described. Analog-to-digital (A/D) conversion and downconversion circuitry (DCC) (not shown) digitizes and downconverts the analog signal for digital processing. The digitized signal is fed to a corresponding multiple access demodulation function, such as the FFT processor 56. Using a discrete FFT or the like, the FFT processor 56 will recover (space-time encoded) FFT data corresponding to that which was modulated in the incoming signal received at a corresponding antenna 28 for each receive path.

A channel estimation function 60 for each receive path provides channel responses corresponding to channel conditions for use by an STC decoder 58. The FFT data from the incoming signal and channel estimates for each receive path are provided to the STC decoder 58. The channel estimates provide sufficient channel response information to allow the STC decoder 58 to decode the FFT data according to STC encoding used by the user elements 16.

The decoded FFT data is then presented to an IFFT post-processor function 62, which provides an inverse discrete FFT (IDFT) or the like on the FFT data to recover the transmitted symbols from each user element 16. The symbols are then demapped by the symbol de-mapping function 64 to recover the corresponding data transmitted by the user elements 16.

In operation, the base station 14 initially identifies MIMO-capable user elements 16 or a sub-set of user elements 16 to collaborate with one another during uplink transmissions. Next, the base station 14 will assign shared resources to each of the cooperating user elements 16 via downlink channels. For an SC-FDM embodiment, the shared resources may include a common sub-carrier block, which is the group of sub-carriers in the time-frequency domain that the user elements 16 will use for transmission. Each of the participating user elements 16 may transmit information using the common sub-carrier block at the same time. Next, the base station 14 may assign user-specific resources to the individual user elements 16 in the group via the downlink channels. Numerous examples of shared and user-specific resources are provided further below.

Once shared and any user-specific resources are assigned, each user element 16 in the cooperating group will transmit data to the base station 14 in synchronized time slots, referred to as transmit time intervals, using the appropriate resources. The base station 14 will receive the transmitted signals from the user elements 16 and extract the pilot signals for each of the user elements 16 to help identify the user elements 16 transmitting information, as well as estimate the channel conditions for the MIMO channel. Finally, the base station 14 will decode the received signals to extract the data or information transmitted by each of the participating user elements 16, as described above.

With reference to FIG. 10A, a transmit time interval (TTI) in the time domain is illustrated. The TTI is broken into seven sub-intervals during which different traffic symbols are transmitted. The traffic symbols may correspond to FFT data, which may or may not be space-time encoded. For SC-FDM and related FDM techniques, each sub-interval is associated with numerous sub-carriers on which samples corresponding to the symbol data are concurrently modulated. Sub-intervals having the same length generally have the same number of available sub-carriers. Thus, the interval for the pilot symbol (PS) may be associated with the same number of sub-carriers as the sub-intervals for the traffic symbols (TS-1 through TS-6). Generally, traffic information is not carried on the pilot symbols, and pilot information is not carried on the traffic symbols.

Figure 10D:
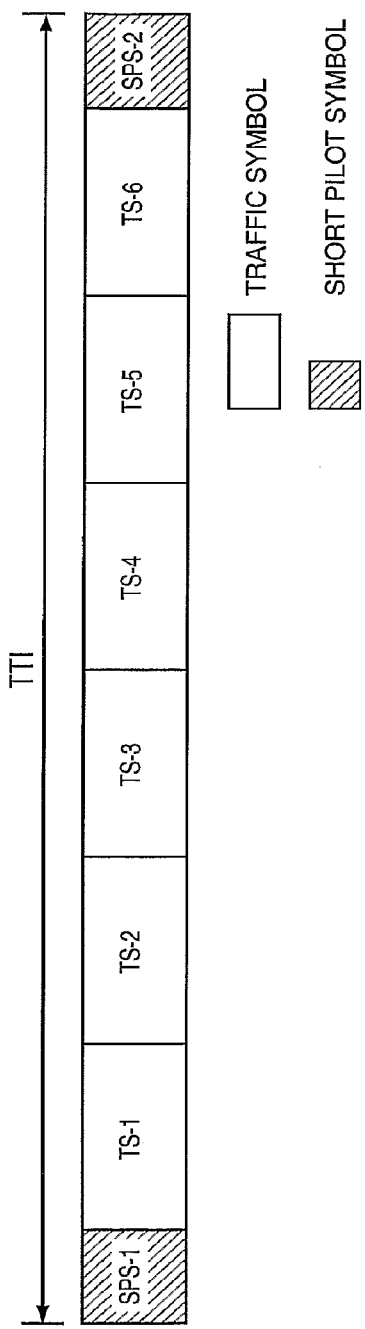
FIG. 10D illustrates a transmit time interval incorporating two short pilot symbols according to a second embodiment.

In one embodiment, the pilot symbol is effectively shortened with respect to the traffic symbols and presented during different sub-intervals in the TTI. As illustrated in FIG. 10B, the pilot symbol of FIG. 10A may be divided into two short pilot symbols (SPS-1 and SPS-2), which are provided during two shortened sub-intervals at different times during the TTI in FIG. 10C. An alternative placement for the shortened pilot symbols is provided in FIG. 10D. For the following description, short pilot symbols are used as examples; however, pilot symbols having the same effective size or length as the traffic symbols may be employed.

Figure 10E:
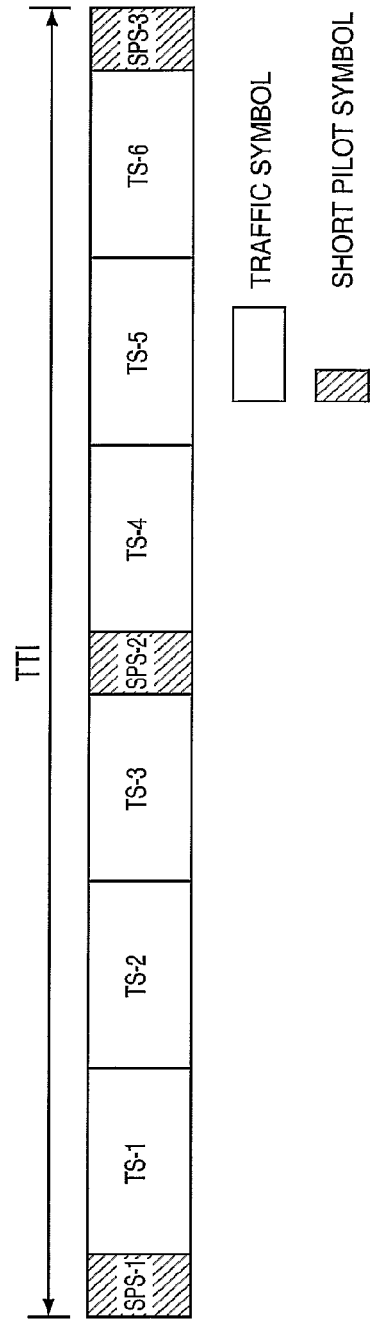
FIG. 10E illustrates a transmit time interval incorporating three short pilot symbols according to a third embodiment.

Shortening a symbol reduces the length of the corresponding sub-interval and reduces the number of available sub-carriers for the symbol. The relative length of a symbol, and thus the corresponding sub-interval, is controlled by the relative length or number of inputs to an IFFT or outputs of an FFT. For transmitting a traffic symbol or pilot symbol of the same length as a traffic symbol, N samples corresponding to the traffic data may be presented to the IFFT to provide N sub-carriers. For transmitting short pilot symbols, the N/M (where M is greater than 1) samples corresponding to the short pilot symbol may be presented to the IFFT to provide N/M sub-carriers. For example, 512 samples for a traffic symbol may be presented to the input of the IFFT to be modulated onto 512 sub-carriers (N=512). A short pilot symbol may be represented by 256 samples, which are presented to the input of the IFFT to be modulated onto 256 sub-carriers (M=2). For the present invention, short pilot symbols having an FFT length less than the traffic symbols may be distributed throughout the TTI. In one embodiment, the combined length of the short pilot symbols corresponds to the length of one traffic symbol. FIGS. 10C and 10D provide examples where the two short pilot symbols (and corresponding sub-intervals) in the TTI are each one-half the length of a traffic symbol. FIG. 10E provides an example where three short pilot symbols (and corresponding sub-intervals) in the TTI are each one-third the length of a traffic symbol.

By using multiple short pilot symbols throughout the TTI, the density of pilot information is increased in the time domain and decreased in the frequency domain as will become more apparent below. By distributing the pilot information throughout the TTI, better channel estimates may be derived over the entire TTI. As a result, demodulation is more accurate, especially for fast-moving user elements 16. This is particularly beneficial in uplink communications because channel estimates from one TTI may not be available or applicable for a subsequent TTI, since different user elements 16 may be using the resources in the subsequent TTI.

For FIGS. 11A through 27, various pilot signal schemes are illustrated for regular and collaborative MIMO in an SC-FDM environment. Certain pilot schemes are for a given user element 16 that has multiple antennas 40, while others are for multiple user elements 16 that have one or more antennas 40. As such, the illustrated pilot schemes often represent the pilot and traffic information of multiple user elements 16 for a given TTI. Each pilot signal scheme employs short pilot symbols and distributes the short pilot symbols along the TTI. Different figures provide short pilot symbols of different lengths; however, certain embodiments may employ traffic symbols of the same size or length as the pilot symbols. In each illustrated scenario, the short pilot symbols are either one-half or one-quarter of the FFT length of the traffic symbols. Those skilled in the art will recognize that the short pilot symbols may have other FFT lengths. For clarity in the following descriptions, the pilot information used for transmission via different antennas from a given user elements 16 is referenced as being for the specific antennas 40.

Each figure provides the sub-carrier mapping for pilot information for the short pilot symbols and data for the traffic part of the frequency domain is illustrated for a given TTI. Each circle represents a sub-carrier for either a short pilot or traffic symbol, either of which may be used by one or more user elements 16 at any given time. Each column of circles represents the sub-carriers associated with a given short pilot symbol or traffic symbol. In each scenario, there are six traffic symbols and the entire TTI is effectively the FFT length of seven traffic symbols. Most of the remaining portion of the TTI is filled with multiple short pilot symbols.

Notably, the time axis of the frequency domain graphs is not linear. In essence, the short pilot symbols require a shorter time period within the TTI relative to the traffic symbols. Further, the short pilot symbols have fewer sub-carriers than the traffic symbols. The relative FFT lengths of the short pilot symbols (SPS) and the traffic symbols (TS) are identified on each figure, as either SPS=½ TS or SPS=¼ TS. As such, the sub-interval for an SPS may be approximately or exactly one-half or one-quarter of the sub-interval for the traffic symbol, depending on the example and after any prefixes or other signaling have been removed. Accordingly, the number of available sub-carriers for the short pilot symbols is one-half or one-quarter of the number of sub-carriers available for the traffic symbols.

Figure 11A:
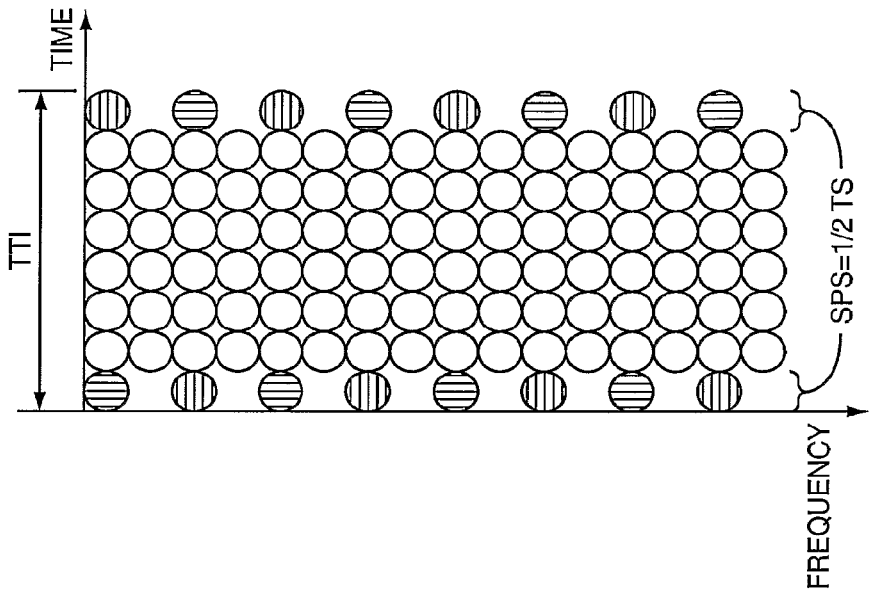
FIGS. 11A and 11B illustrate two different pilot signal schemes according to a first embodiment of the present invention.
Figure 11B:
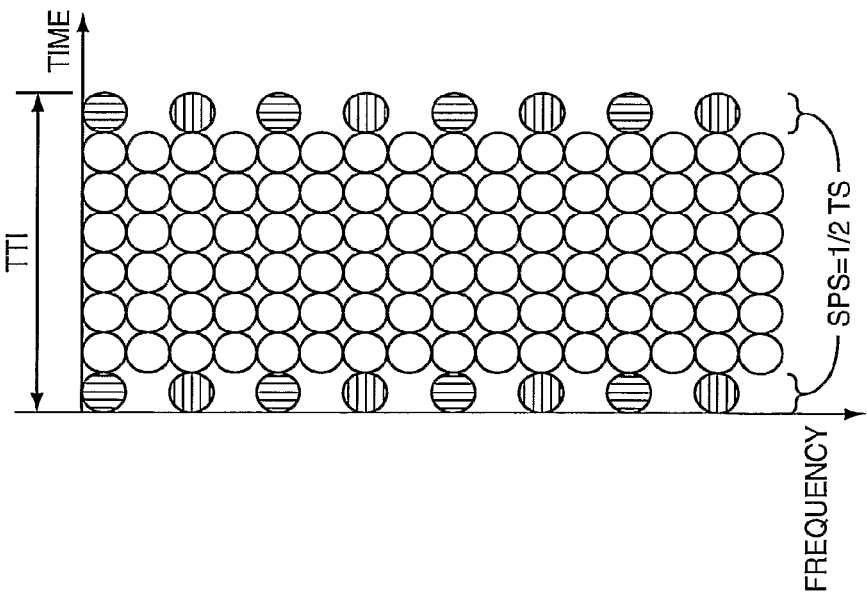

With particular reference to FIGS. 11A and 11B, two different pilot schemes are provided for a single user element 16 that can provide MIMO communications via two antennas, which are referenced as Ant-0 and Ant-1. As illustrated, pilot information associated with both antennas Ant-0 and Ant-1 is provided on two short pilot symbols, which are located on either end of the TTI. The short pilot symbols have an FFT length that is one-half of that of the traffic symbols. The same sub-carriers for a given traffic symbol may be used by each antenna Ant-0 and Ant-1 to transmit data at any given time. The six traffic symbols are used for space-time coded information, which may represent the space-time division or spatial multiplexing of FFT data. In this embodiment, the pilot information for each of the antennas Ant-0 and Ant-1 is orthogonally mapped onto the sub-carriers of both of the short pilot symbols. Given the orthogonal nature of the mapping, any one sub-carrier of the short pilot symbols will have pilot information for only one of the two antennas Ant-0 and Ant-1.

For FIGS. 12A and 12B, two different pilot schemes are provided for a single user element 16 that can provide MIMO communications via the two antennas 40, Ant-0 and Ant-1. As illustrated, pilot information associated with both antennas Ant-0 and Ant-1 are provided on three short pilot symbols, which are located on either end and in the middle of the TTI. The short pilot symbols have an FFT length that is one-quarter that of the traffic symbols. The remaining portion of the TTI may be filled with prefix or other signaling information. The six traffic symbols are used for transmitting traffic data (data). The same sub-carriers for a given traffic symbol may be used by each antenna Ant-0 and Ant-1 to transmit data at any given time. In this embodiment, the pilot information for each of the antennas Ant-0 and Ant-1 is orthogonally mapped onto the sub-carriers of the short pilot symbols. Given the orthogonal nature of the mapping, any one sub-carrier of the short pilot symbols will have pilot information for only one of the two antennas Ant-0 and Ant-1.

Figure 13A:
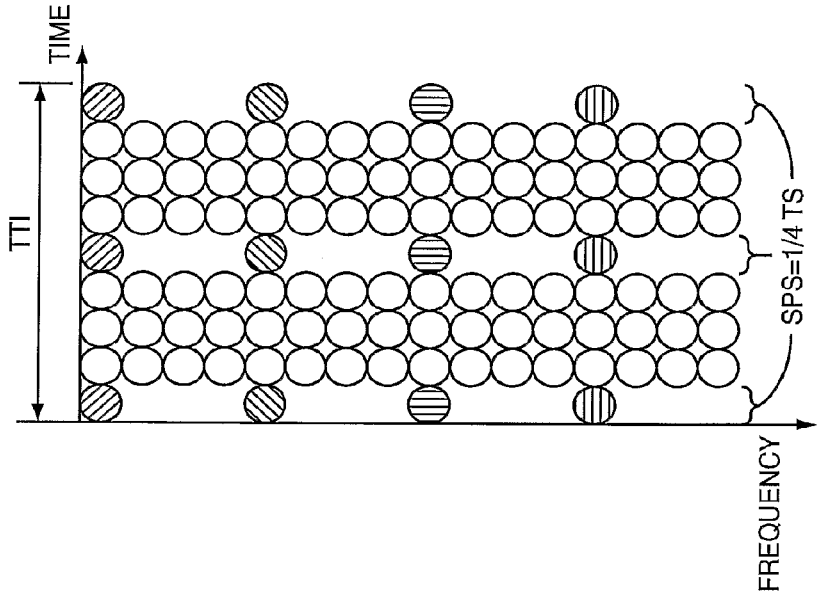
FIGS. 13A and 13B illustrate two different pilot signal schemes according to a third embodiment of the present invention.
Figure 13B:
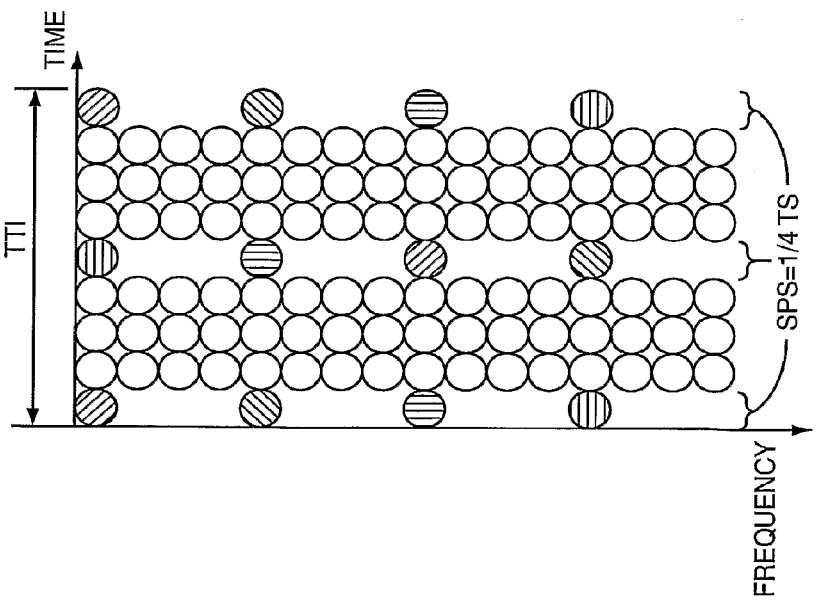

For FIGS. 13A and 13B, two different pilot schemes are provided for a single user element 16 that can provide MIMO communications via four antennas 40, which are referenced as Ant-0, Ant-1, Ant-2, and Ant-3. As illustrated, pilot information associated with each antenna Ant-0, Ant-1, Ant-2, and Ant-3 are provided on three short pilot symbols, which are located on either end and in the middle of the TTI. The short pilot symbols have an FFT length that is one-quarter that of the traffic symbols. The remaining portion of the TTI may be filled with prefix or other signaling information. The six traffic symbols are used for transmitting traffic data (data). The same sub-carriers for a given traffic symbol may be used by each antenna Ant-0, Ant-1, Ant-2, and Ant-3 to transmit data at any given time. In this embodiment, the pilot information for each of the antennas Ant-0, Ant-1, Ant,-2, and Ant-3 is orthogonally mapped onto the sub-carriers of the short pilot symbols. Given the orthogonal nature of the mapping, any one sub-carrier of the short pilot symbols will have pilot information for only one of the four antennas Ant-0, Ant-1, Ant-2, and Ant-3.

For FIGS. 14A and 14B, two different pilot schemes are provided for a single user element 16 that can provide MIMO communications via four antennas 40, which are referenced as Ant-0, Ant-1, Ant-2, and Ant-3. As illustrated, pilot information associated with each antenna Ant-0, Ant-1, Ant-2, and Ant-3 are provided on two short pilot symbols, which are located on either end of the TTI. The short pilot symbols have an FFT length that is one-half of that of the traffic symbols. Any remaining portions of the TTI may be filled with prefix or other signaling information. The six traffic symbols are used for transmitting traffic data (data). The same sub-carriers for a given traffic symbol may be used by each antenna Ant-0, Ant-1, Ant-2, and Ant-3 to transmit data at any given time. In this embodiment, the pilot information for each of the antennas Ant-0, Ant-1, Ant,-2, and Ant-3 is orthogonally mapped onto the sub-carriers of the short pilot symbols. Given the orthogonal nature of the mapping, any one sub-carrier of the short pilot symbols will have pilot information for only one of the four antennas Ant-0, Ant-1, Ant-2, and Ant-3.

For FIGS. 15A and 15B, two different pilot schemes are provided for two user elements 16, each which can provide MIMO communications via two antennas 40. The two user elements 16 are referenced as UE-1 and UE-2. The two antennas for UE-1 are referenced as Ant-0/UE-1 and Ant-1/UE-1. The two antennas for UE-2 are referenced as Ant-0/UE-2 and Ant-1/UE-2. As illustrated, pilot information associated with each user element UE-1 and UE-2, and in particular with antenna Ant-0/UE-1, Ant-1/UE-1, Ant-0/UE-2, and Ant-1/UE-2 are provided on three short pilot symbols, which are located on either end and in the middle of the TTI. The short pilot symbols have an FFT length that is one-quarter of that of the traffic symbols. The remaining portion of the TTI may be filled with prefix or other signaling information. The six traffic symbols are used for transmitting traffic data (data) for each of the user elements UE-1 and UE-2. The same sub-carriers for a given traffic symbol may be used by each antenna Ant-0/UE-1, Ant-1/UE-1, Ant-0/UE-2, and Ant-1/UE-2 to transmit data at any given time. In this embodiment, the pilot information for each of the antennas Ant-0/UE-1, Ant-1/UE-1, Ant-0/UE-2, and Ant-1/UE-2 is orthogonally mapped onto the sub-carriers of the short pilot symbols. Given the orthogonal nature of the mapping, any one sub-carrier of the short pilot symbols will have pilot information for only one of the four antennas Ant-0/UE-1, Ant-1/UE-1, Ant-0/UE-2, and Ant-1/UE-2. Further, the traffic data for both user elements UE-1 and UE-2 are transmitted on sub-carriers for each of the traffic symbols. However, the user elements UE-1 and UE-2 are allocated unique sub-carriers for each traffic symbol. Thus, only one of the user elements UE-1 and UE-2 may use a given sub-carrier for transmitting traffic data from antenna Ant-0 and Ant-1 at the same time. The given sub-carrier will not be used by the other of the user elements UE-1 and UE-2.

Figure 16A:
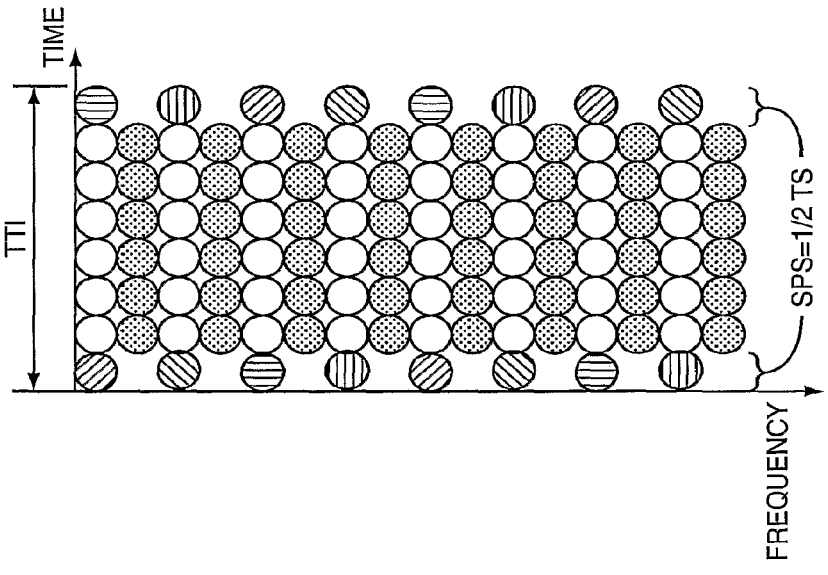
FIGS. 16A and 16B illustrate two different pilot signal schemes according to a sixth embodiment of the present invention.
Figure 16B:
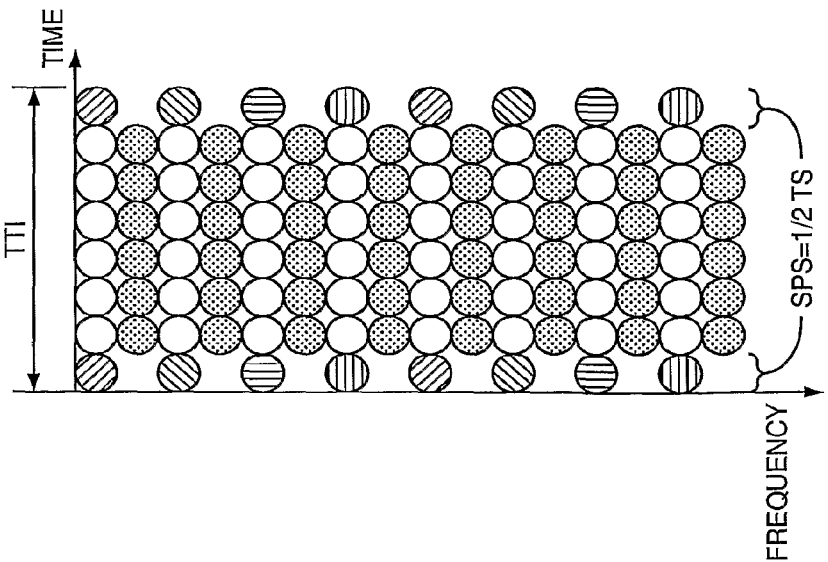

For FIGS. 16A and 16B, two different pilot schemes are provided for two user elements 16, each which can provide MIMO communications via the two antennas 40. The two user elements 16 are referenced as UE-1 and UE-2. The two antennas for UE-1 are referenced as Ant-0/UE-1 and Ant-1/UE-1. The two antennas for UE-2 are referenced as Ant-0/UE-2 and Ant-1/UE-2. As illustrated, pilot information associated with each user element UE-1 and UE-2, and in particular with antenna Ant-0/UE-1, Ant-1/UE-1, Ant-0/UE-2, and Ant-1/UE-2 are provided on two short pilot symbols, which are located on either end of the TTI. The short pilot symbols have an FFT length that is one-half of that of the traffic symbols. The remaining portion of the TTI may be filled with prefix or other signaling information. The six traffic symbols are used for transmitting traffic data (data) for each of the user elements UE-1 and UE-2. The same sub-carriers for a given traffic symbol may be used by each antenna Ant-0/UE-1, Ant-1/UE-1, Ant-0/UE-2, and Ant-1/UE-2 to transmit data at any given time. In this embodiment, the pilot information for each of the antennas Ant-0/UE-1, Ant-1/UE-1, Ant-0/UE-2, and Ant-1/UE-2 is orthogonally mapped onto the sub-carriers of the short pilot symbols. Given the orthogonal nature of the mapping, any one sub-carrier of the short pilot symbols will have pilot information for only one of the four antennas Ant-0/UE-1, Ant-1/UE-1, Ant-0/UE-2, and Ant-1/UE-2. Further, the traffic data for both user elements UE-1 and UE-2 are transmitted on sub-carriers for each of the traffic symbols. However, the user elements UE-1 and UE-2 are allocated unique sub-carriers for each traffic symbol. Thus, only one of the user elements UE-1 and UE-2 may use a given sub-carrier for transmitting traffic data from antenna Ant-0 and Ant-1 at the same time. The given sub-carrier will not be used by the other of the user elements UE-1 and UE-2.

Figure 17A:
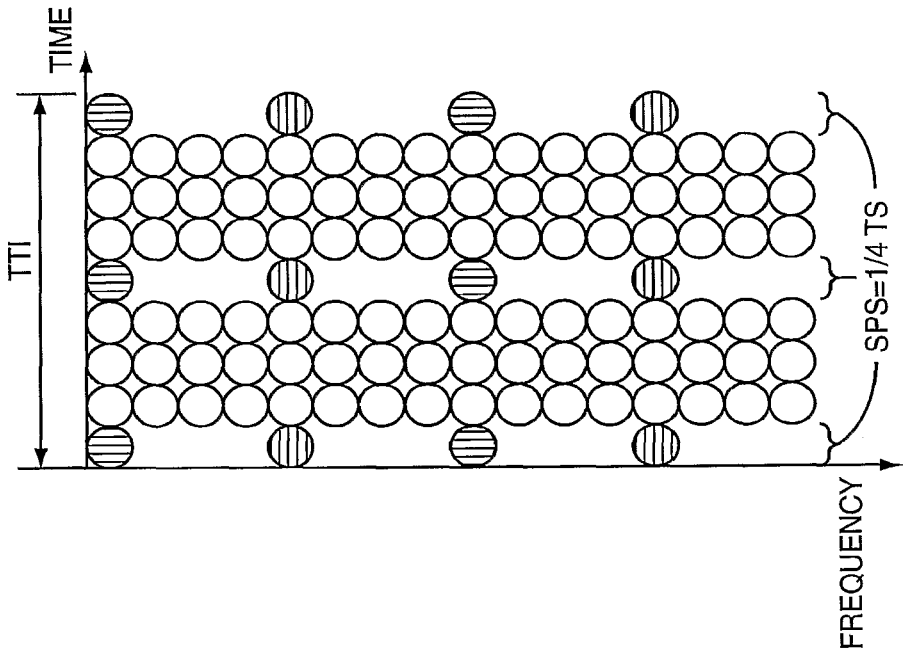
FIGS. 17A and 17B illustrate two different pilot signal schemes according to a seventh embodiment of the present invention.
Figure 17B:
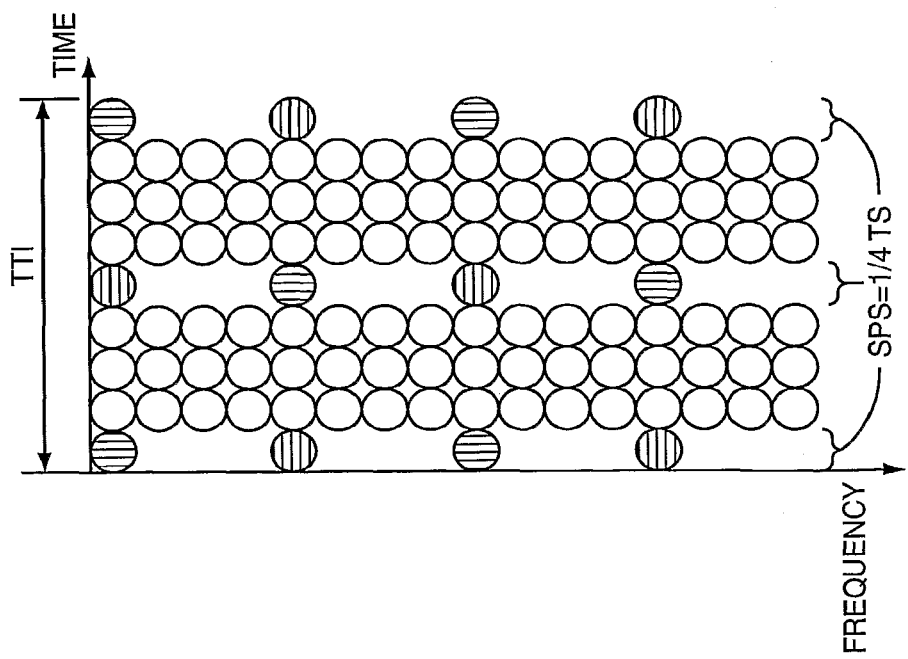

For FIGS. 17A and 17B, two different pilot schemes are provided for two user elements UE-1 and UE2 that each have one antenna 40 and are collaborating to effect MIMO communications. As illustrated, pilot information associated with both user elements UE-1 and UE-2 are provided on three short pilot symbols, which are located on either end and in the middle of the TTI. The short pilot symbols have an FFT length that is one-quarter of that of the traffic symbols. The remaining portion of the TTI may be filled with prefix or other signaling information. The six traffic symbols are used for transmitting traffic data (data) of the user elements UE-1 and UE-2. Any given sub-carrier may be assigned solely to one of the user elements UE-1 and UE-2 or assigned to both of the user elements UE-1 and UE-2 for transmitting traffic data at any given time. In this embodiment, the pilot information for each of the antennas of user elements UE-1 and UE-2 is orthogonally mapped onto the sub-carriers of the short pilot symbols. Given the orthogonal nature of the mapping, any one sub-carrier of the short pilot symbols will have pilot information for only one of the two user elements UE-1 and UE-2.

For FIGS. 18A and 18B, two different pilot schemes are provided for two user elements UE-1 and UE2 that each have one antenna 40 and are collaborating to effect MIMO communications. As illustrated, pilot information associated with both user elements UE-1 and UE-2 are provided on two short pilot symbols, which are located on either end of the TTI. The short pilot symbols have an FFT length that is one-half of that of the traffic symbols. Any remaining portion of the TTI may be filled with prefix or other signaling information. The six traffic symbols are used for transmitting traffic data (data) of the user elements UE-1 and UE-2. Any given sub-carrier may be assigned solely to one of the user elements UE-1 and UE-2 or assigned to both of the user elements UE-1 and UE-2 for transmitting traffic data at any given time. In this embodiment, the pilot information for each of the antennas of user elements UE-1 and UE-2 is orthogonally mapped onto the sub-carriers of the short pilot symbols. Given the orthogonal nature of the mapping, any one sub-carrier of the short pilot symbols will have pilot information for only one of the two user elements UE-1 and UE-2.

For FIGS. 19A and 19B, two different pilot schemes are provided for two user elements 16, each of which can provide MIMO communications via two antennas 40. The two user elements 16 are referenced as UE-1 and UE-2. The two antennas for UE-1 are referenced as Ant-0/UE-1 and Ant-1/UE-1. The two antennas for UE-2 are referenced as Ant-0/UE-2 and Ant-1/UE-2. As illustrated, pilot information associated with each user element UE-1 and UE-2, and in particular with antenna Ant-0/UE-1, Ant-1/UE-1, Ant-0/UE-2, and Ant-1/UE-2 are provided on three short pilot symbols, which are located on either end and in the middle of the TTI. The short pilot symbols have an FFT length that is one-quarter of that of the traffic symbols. The remaining portion of the TTI may be filled with prefix or other signaling information. The six traffic symbols are used for transmitting traffic data (data) for each of the user elements UE-1 and UE-2. The same sub-carriers for a given traffic symbol may be used by each antenna Ant-0/UE-1, Ant-1/UE-1, Ant-0/UE-2, and Ant-1/UE-2 to transmit data at any given time. In this embodiment, the pilot information for each of the antennas Ant-0/UE-1, Ant-1/UE-1, Ant-0/UE-2, and Ant-1/UE-2 is orthogonally mapped onto the sub-carriers of the short pilot symbols. Given the orthogonal nature of the mapping, any one sub-carrier of the short pilot symbols will have pilot information for only one of the four antennas Ant-0/UE-1, Ant-1/UE-1, Ant-0/UE-2, and Ant-1/UE-2. The traffic data for both user elements UE-1 and UE-2 may be transmitted on the same sub-carriers of the traffic symbols at any given time. Thus, both of the user elements UE-1 and UE-2 may use a given sub-carrier for transmitting traffic data from antenna Ant-0 and Ant-1 at the same time.

For FIGS. 20A and 20B, two different pilot schemes are provided for two user elements 16, each which can provide MIMO communications via two antennas 40. The two user elements 16 are referenced as UE-1 and UE-2. The two antennas for UE-1 are referenced as Ant-0/UE-1 and Ant-1/UE-1. The two antennas for UE-2 are referenced as Ant-0/UE-2 and Ant-1/UE-2. As illustrated, pilot information associated with each user element UE-1 and UE-2, and in particular with antenna Ant-0/UE-1, Ant-1/UE-1, Ant-0/UE-2, and Ant-1/UE-2 are provided on two short pilot symbols, which are located on either end of the TTI. The short pilot symbols have an FFT length that is one-half of that of the traffic symbols. The remaining portion of the TTI may be filled with prefix or other signaling information. The six traffic symbols are used for transmitting traffic data (data) for each of the user elements UE-1 and UE-2. The same sub-carriers for a given traffic symbol may be used by each antenna Ant-0/UE-1, Ant-1/UE-1, Ant-0/UE-2, and Ant-1/UE-2 to transmit data at any given time. In this embodiment, the pilot information for each of the antennas Ant-0/UE-1, Ant-1/UE-1, Ant-0/UE-2, and Ant-1/UE-2 is orthogonally mapped onto the sub-carriers of the short pilot symbols. Given the orthogonal nature of the mapping, any one sub-carrier of the short pilot symbols will have pilot information for only one of the four antennas Ant-0/UE-1, Ant-1/UE-1, Ant-0/UE-2, and Ant-1/UE-2. Further, the traffic data for both user elements UE-1 and UE-2 are transmitted on sub-carriers for each of the traffic symbols. The traffic data for both user elements UE-1 and UE-2 may be transmitted on the same sub-carriers of the traffic symbols at any given time. Thus, both of the user elements UE-1 and UE-2 may use a given sub-carrier for transmitting traffic data from antenna Ant-0 and Ant-1 at the same time.

Figure 21A:
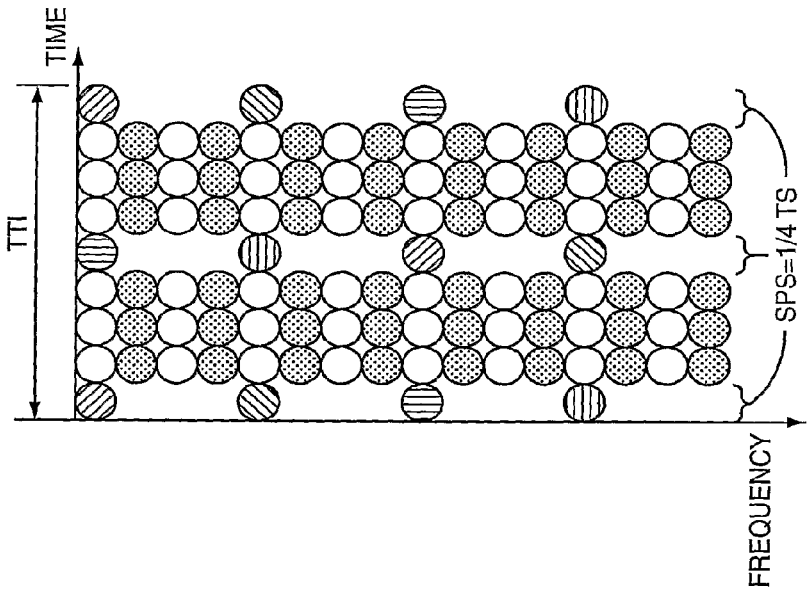
FIGS. 21A and 21B illustrate two different pilot signal schemes according to an eleventh embodiment of the present invention.
Figure 21B:
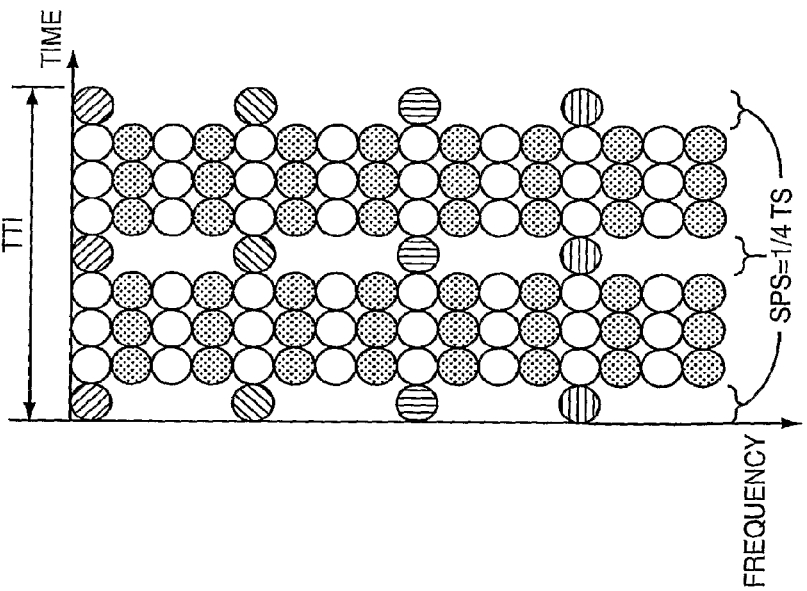

For FIGS. 21A and 21B, two different pilot schemes are provided for four user elements 16 that each have one antenna 40 and are collaborating to effect MIMO communications. The four user elements 16 are referenced as UE-1, UE-2, UE-3, and UE-4. As illustrated, pilot information associated with user elements UE-1, UE-2, UE-3, and UE-4 are provided on three short pilot symbols, which are located on either end and in the middle of the TTI. The short pilot symbols have an FFT length that is one-quarter of that of the traffic symbols. The remaining portion of the TTI may be filled with prefix or other signaling information. The six traffic symbols are used for transmitting traffic data (data) for each of the user elements UE-1, UE-2, UE-3, and UE-4. The same sub-carriers for a given traffic symbol may be used by user elements UE-1, UE-2, UE-3, and UE-4 to transmit data at any given time. In this embodiment, the pilot information for each of the user elements UE-1, UE-2, UE-3, UE-4 is orthogonally mapped onto the sub-carriers of the short pilot symbols. Given the orthogonal nature of the mapping, any one sub-carrier of the short pilot symbols will have pilot information for only one of the user elements UE-1, UE-2, UE-3, and UE-4. Further, the traffic data for user elements UE-1 and UE-2 are allocated certain sub-carriers for each of the traffic symbols while traffic data for user elements UE-3 and UE-4 are allocated different sub-carriers for each of the traffic symbols. The user elements UE-1 and UE-2 may use an allocated sub-carrier for transmitting traffic data at the same time. User elements UE-3 and UE-4 may do the same. However, user elements UE-1 and UE-2 may not use the sub-carriers that are allocated to user elements UE-3 and UE-4, and vice versa.

For FIGS. 22A and 22B, two different pilot schemes are provided for four user elements 16 that each have one antenna 40 and are collaborating to effect MIMO communications. The four user elements 16 are referenced as UE-1, UE-2, UE-3, and UE-4. As illustrated, pilot information associated with user elements UE-1, UE-2, UE-3, and UE-4 are provided on two short pilot symbols, which are located on either end of the TTI. The short pilot symbols have an FFT length that is one-half of that of the traffic symbols. The remaining portion of the TTI may be filled with prefix or other signaling information. The six traffic symbols are used for transmitting traffic data (data) for each of the user elements UE-1, UE-2, UE-3, and UE-4. The same sub-carriers for a given traffic symbol may be used by user elements UE-1, UE-2, UE-3, and UE-4 to transmit data at any given time. In this embodiment, the pilot information for each of the user elements UE-1, UE-2, UE-3, UE-4 is orthogonally mapped onto the sub-carriers of the short pilot symbols. Given the orthogonal nature of the mapping, any one sub-carrier of the short pilot symbols will have pilot information for only one of the user elements UE-1, UE-2, UE-3, and UE-4. Further, the traffic data for user element UE-1 and UE-2 are allocated certain sub-carriers for each of the traffic symbols, while traffic data for user elements UE-3 and UE-4 are allocated different sub-carriers for each of the traffic symbols. The user elements UE-1 and UE-2 may use an allocated sub-carrier for transmitting traffic data at the same time. User elements UE-3 and UE-4 may do the same. However, user elements UE-1 and UE-2 may not use the sub-carriers that are allocated to user elements UE-3 and UE-4, and vice versa.

With the above embodiments, the sub-carriers for a given short pilot symbol were not shared at any given time for different antennas 40 or user elements 16. Once a sub-carrier of a short pilot symbol was assigned pilot information for an antenna 40 or user element 16, a base station 14 would not assign the sub-carrier for use by other antennas 40 or user elements 16 at that time. With another embodiment of the invention, the same sub-carrier may be used by different antennas 40 or user elements 16 by employing code division multiplexing (CDM). In essence, each antenna 40 or user element 16 is associated with a unique code, which is used to process the corresponding pilot information. The encoded pilot information for different antennas 40 or user elements 16 may then be assigned to the same sub-carriers. The encoding of the pilot information may take place in the pilot symbol generation function 54 of the transmitter architectures illustrated in FIGS. 8A and 8B.

For FIGS. 23A and 23B the pilot information is encoded using CDM techniques and mapped to the same sub-carriers of the short pilot symbols. For FIG. 23A, a pilot scheme is provided for two user elements UE-1 and UE-2 that each have one antenna 40 and are collaborating to effect MIMO communications. As illustrated, pilot information associated with both user elements UE-1 and UE-2 are provided on three short pilot symbols, which are located on either end and in the middle of the TTI. The short pilot symbols have an FFT length that is one-quarter of that of the traffic symbols. The remaining portion of the TTI may be filled with prefix or other signaling information. The six traffic symbols are used for transmitting traffic data (data) of the user elements UE-1 and UE-2. Any given sub-carrier may be assigned solely to one of the user elements UE-1 and UE-2 or assigned to both of the user elements UE-1 and UE-2 for transmitting traffic data at any given time. In this embodiment, the CDM encoded pilot information for each of the antennas for user elements UE-1 and UE-2 are mapped onto the same sub-carriers of the short pilot symbols. Although pilot information for both user elements 16 are mapped on the same sub-carriers of the short pilot symbols, the pilot information for each user element 16 is still orthogonal due to the CDM encoding.

The pilot scheme provided in FIG. 23B is similar to that of FIG. 23A, except that the CDM encoded pilot information associated with both user elements UE-1 and UE-2 are provided on two short pilot symbols, which are located on either end of the TTI. The short pilot symbols have an FFT length that is one-half of that of the traffic symbols. Again, the CDM encoded pilot information for each of the antennas for user elements UE-1 and UE-2 are mapped onto the same sub-carriers of the short pilot symbols.

Sounding pilots may be employed by user elements 16 to assist in determining channel conditions. Sounding pilots are generally not modulated with known data. With reference to FIG. 24, a pilot scheme is provided for two user elements UE-1 and UE-2 that each have one antenna 40 and are collaborating to effect MIMO communications. As illustrated, pilot information associated with both user elements UE-1 and UE-2 are provided on two short pilot symbols, which are located on either end of the TTI. The short pilot symbols have an FFT length that is one-half of that of the traffic symbols. Any remaining portion of the TTI may be filled with prefix or other signaling information. The six traffic symbols are used for transmitting traffic data (data) of the user elements UE-1 and UE-2. Any given sub-carrier may be assigned solely to one of the user elements UE-1 and UE-2 or assigned to both of the user elements UE-1 and UE-2 for transmitting traffic data at any given time. In this embodiment, the pilot information for each of the antennas user elements UE-1 and UE-2 is orthogonally mapped onto every other one of the sub-carriers of the short pilot symbols. Given the orthogonal nature of the mapping, these sub-carriers will have pilot information for only one of the two user elements UE-1 and UE-2. The remaining sub-carriers of the short pilot symbols may be used by user elements 16 other than user elements UE-1 and UE-2 to provide sounding pilots. These sounding pilots for each of the other user elements 16 may be mapped to unique sub-carriers. Alternatively, the sounding pilots may be CDM encoded and mapped to common sub-carriers.

The pilot scheme in FIG. 25 is similar to that in FIG. 24, except that the pilot information for user elements UE-1 and UE-2 is CDM encoded and mapped to the same sub-carriers of the short pilot symbol. As such, half of the sub-carriers in the short pilot symbols are allocated to CDM encode pilot information for user elements UE-1 and UE-2, while other sub-carriers of the short pilot symbols are allocated for sounding pilots for other user elements 16.

The pilot scheme of FIG. 26 is similar to that of FIG. 24, except that all of the sub-carriers in the short pilot symbols are allocated to the user elements UE-1 and UE-2 for pilot information and sounding pilots. These sub-carriers may also be used for sounding pilots by other user elements 16 in addition to user elements UE-1 and UE-2. The pilot information and the sounding information for the respective user elements UE-1 and UE-2 are CDM encoded to maintain orthogonality.

In FIG. 27, the sub-carriers of the short pilot symbols are broken into three groups. The first group of sub-carriers is used by user elements UE-1 and UE-2 for pilot information and sounding pilots. These sub-carriers may also be used for sounding pilots by other user elements 16 in addition to user elements UE-1 and UE-2. The pilot information and the sounding pilots are CDM encoded and allocated to the same sub-carriers. The second group of sub-carriers is used solely for pilot information (no sounding pilots) by user elements UE-1 and UE-2. The pilot information is CDM encoded and allocated to the same sub-carriers. The third group of sub-carriers is allocated for sounding pilots for user elements 16 other than user elements UE-1 and UE-2.

The pilot scheme of FIG. 28 is similar to that of FIG. 27, except that the sub-carriers of the short pilot symbols are broken into four groups. The first group of sub-carriers is used by user elements UE-1 and UE-2 for pilot information and sounding pilots. These sub-carriers may also be used for sounding pilots by other user elements 16 in addition to user elements UE-1 and UE-2. The pilot information and the sounding pilots are CDM encoded and allocated to the same sub-carriers. The second group of sub-carriers is used solely for pilot information (no sounding pilots) by user element UE-1. The third group of sub-carriers is used solely for pilot information (no sounding pilots) by user element UE-2. The pilot information for groups two and three is allocated to the different sub-carriers. The fourth group of sub-carriers is allocated for sounding pilots for user elements 16 other than user elements UE-1 and UE-2.

From the above, those skilled in the art will recognize that innumerable other pilot schemes that employ the concepts of the present invention are possible. For example, the examples provided in FIGS. 23A through 27 may be extended for mobile terminals 16 having multiple antennas 40 in addition to the collaborative examples provided.

The pilot schemes are generally under the control of the base station 14, which may instruct the user elements 16 being served by the base station 14 to employ particular pilot schemes. The pilot schemes may be based on channel conditions and the relative speed of the user elements 16. The length of the short pilot symbols may be dynamically changed as well as the placement or spacing of the short pilot symbols in the TTI. Further, the number and location of sub-carriers of the short pilot symbols that are assigned to a given user element 16 or antenna 40 thereof may change from TTI to TTI.

Those skilled in the art will recognize improvements and modifications to the preferred embodiments of the present invention. All such improvements and modifications are considered within the scope of the concepts disclosed herein and the claims that follow.

What is claimed is:

1. A method of transmitting sounding pilot information, the method comprising:
    performing, by a mobile terminal:
        generating the sounding pilot information for a transmitter; and
        mapping the sounding pilot information for the transmitter onto at least certain subcarriers of a first group of subcarriers within a transmission time interval (TTI);
    wherein the transmission time interval (TTI) comprises one or more pilot symbols and a plurality of traffic symbols;
    wherein the one or more pilot symbols comprises at least the first group of subcarriers and at least a second group of subcarriers, wherein the first group of sub-carriers are sounding pilots, wherein the second group of subcarriers are pilots for demodulation, and wherein the second group does not comprise sounding pilots.

2. The method of claim 1, wherein said generating the sounding pilot information comprises:
    generating the sounding pilot information with an orthogonal code for the transmitter.

3. The method of claim 1, wherein said mapping the sounding pilot information comprises:
    mapping the sounding pilot information for the transmitter onto at least certain subcarriers of the first group of subcarriers, wherein the first group of subcarriers is mapped every other one of the subcarriers for a block of subcarriers.

4. The method of claim 1, further comprising:
    generating data information for the transmitter;
    mapping the data information for the transmitter onto at least certain of the subcarriers of the plurality of traffic symbols;
    generating pilot information for the transmitter; and
    mapping the pilot information for the transmitter onto at least certain of the second group of subcarriers of the at least one pilot symbol.

5. The method of claim 1, wherein said mapping the sounding pilot information comprises:
    mapping the sounding pilot information for the transmitter onto at least certain subcarriers of the first group of subcarriers, wherein the sounding pilot information for the transmitter and sounding pilot information for one or more other transmitters are multiplexed on the first group of sub-carriers.

6. The method of claim 1,
    wherein said generating the sounding pilot information comprises generating the sounding pilot information with an orthogonal code for the transmitter; and
    wherein said mapping the sounding pilot information comprises mapping the sounding pilot information for the transmitter onto at least certain subcarriers of the first group of sub-carriers, wherein the sounding pilot information for the transmitter and sounding pilot information for one or more other transmitters, each generated with orthogonal codes, are mapped onto common subcarriers of the first group of subcarriers.

7. The method of claim 1, wherein said mapping the sounding pilot information comprises:
    mapping the sounding pilot information for the transmitter onto at least certain subcarriers of the first group of subcarriers, such that the sounding pilot information for the transmitter and sounding pilot information for one or more other transmitters are multiplexed in frequency on different subcarriers of the first group of subcarriers.

8. A transmitter, comprising:
    sounding pilot generation circuitry configured to generate sounding pilot information for a transmitter; and
    subcarrier mapping circuitry configured to map sounding pilot information for the transmitter onto at least certain subcarriers of a first group of subcarriers within a transmission time interval (TTI);

wherein the transmission time interval (TTI) comprises one or more pilot symbols and a plurality of traffic symbols;

wherein the one or more pilot symbols comprises at least the first group of subcarriers and at least a second group of subcarriers, wherein the first group of subcarriers are sounding pilots, wherein the second group of subcarriers are pilots for demodulation, and wherein the second group does not comprise sounding pilots.

9. The transmitter of claim 8, wherein to generate the sounding pilot information, the sounding pilot generation circuitry is further configured to:

generate the sounding pilot information with an orthogonal code for the transmitter.

10. The transmitter of claim 8, wherein to map the sounding pilot information, the subcarrier mapping circuitry is further configured to:

map the sounding pilot information for the transmitter onto at least certain subcarriers of the first group of subcarriers, wherein the first group of subcarriers is mapped every other one of the subcarriers for a block of subcarriers.

11. The transmitter of claim 8, further comprising:

data generation circuitry configured to generate data information for the transmitter, wherein the subcarrier mapping circuitry is further configured to map the data information for the transmitter onto at least certain of the sub-carriers of the plurality of traffic symbols; and pilot generation circuitry configured to generate pilot information for the transmitter, wherein the subcarrier mapping circuitry is further configured to map the pilot information for the transmitter onto at least certain of the second group of subcarriers of the at least one pilot symbol.

12. The transmitter of claim 8, wherein to map the sounding pilot information, the subcarrier mapping circuitry is further configured to:

map the sounding pilot information for the transmitter onto at least certain subcarriers of the first group of subcarriers, wherein the sounding pilot information for the transmitter and sounding pilot information for one or more other transmitters are multiplexed on the first group of sub-carriers.

13. The transmitter of claim 8, wherein to generate the sounding pilot information, the sounding pilot generation circuitry is further configured to generate the sounding pilot information with an orthogonal code for the transmitter; and wherein to map the sounding pilot information, the subcarrier mapping circuitry is further configured to map the sounding pilot information for the transmitter onto at least certain subcarriers of the first group of sub-carriers, wherein the sounding pilot information for the transmitter and sounding pilot information for one or more other transmitters, each generated with orthogonal codes, are mapped onto common subcarriers of the first group of subcarriers.

14. The transmitter of claim 8, wherein to map the sounding pilot information, the subcarrier mapping circuitry is further configured to:

map the sounding pilot information for the transmitter onto at least certain subcarriers of the first group of subcarriers, wherein the sounding pilot information for the transmitter and sounding pilot information for one or more other transmitters are multiplexed in frequency on different subcarriers of the first group of subcarriers.

15. A base station, comprising;

receive circuitry configured to receive radio frequency signals through the antennas bearing information from one or more remote transmitters;

wherein the information from a first transmitter comprises sounding pilot information;

wherein the sounding pilot information is mapped to at least certain subcarriers of a first group of subcarriers within a transmission time interval (TTI);

wherein the transmission time interval (TTI) comprises one or more pilot symbols and a plurality of traffic symbols;

wherein the one or more pilot symbols comprises at least the first group of subcarriers and at least a second group of subcarriers, wherein the first group of subcarriers are sounding pilots, wherein the second group of subcarriers are pilots for demodulation, and wherein the second group does not comprise sounding pilots.

16. The base station of claim 15, wherein the receive circuitry is further configured to receive the sounding pilot information encoded with an orthogonal code for the first transmitter.

17. The base station of claim 15, wherein the receive circuitry is further configured to:

receive the sounding pilot information for the first transmitter on at least certain subcarriers of the first group of subcarriers, wherein the first group of subcarriers is mapped every other one of the subcarriers for a block of subcarriers.

18. The base station of claim 15, wherein the receive circuitry is further configured to:

receive sounding pilot information for the first transmitter on at least certain subcarriers of the first group of sub-carriers, wherein the sounding pilot information for the transmitter and sounding pilot information for one or more other transmitters are multiplexed on the first group of sub-carriers.

19. The base station of claim 15, wherein the receive circuitry is further configured to:

receive the sounding pilot information encoded with an orthogonal code for the first transmitter on at least certain subcarriers of the first group of sub-carriers, wherein the sounding pilot information for the transmitter and sounding pilot information for one or more other transmitters, each generated with orthogonal codes, are mapped on common subcarriers of the first group of subcarriers.

20. The transmitter of claim 15, wherein the receive circuitry is further configured to:

receive the sounding pilot information for the first transmitter on at least certain subcarriers of the first group of subcarriers, wherein the sounding pilot information for the transmitter and sounding pilot information for one or more other transmitters are multiplexed in frequency on different subcarriers of the first group of subcarriers.

* * * * *